(12) United States Patent
Nalci et al.

(10) Patent No.: US 12,301,876 B2
(45) Date of Patent: *May 13, 2025

(54) TRANSFORM AND LAST SIGNIFICANT COEFFICIENT POSITION SIGNALING FOR LOW-FREQUENCY NON-SEPARABLE TRANSFORM IN VIDEO CODING

(71) Applicant: QUALCOMM Incorporated, San Diego, CA (US)

(72) Inventors: Alican Nalci, La Jolla, CA (US); Hilmi Enes Egilmez, San Diego, CA (US); Vadim Seregin, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/321,372

(22) Filed: May 22, 2023

(65) Prior Publication Data
US 2023/0412844 A1     Dec. 21, 2023

Related U.S. Application Data

(63) Continuation of application No. 16/899,063, filed on Jun. 11, 2020, now Pat. No. 11,695,960.
(Continued)

(51) Int. Cl.
*H04N 19/645* (2014.01)
*H04N 19/124* (2014.01)
(Continued)

(52) U.S. Cl.
CPC ......... *H04N 19/645* (2014.11); *H04N 19/124* (2014.11); *H04N 19/176* (2014.11);
(Continued)

(58) Field of Classification Search
CPC .. H04N 19/124; H04N 19/645; H04N 19/176; H04N 19/186
See application file for complete search history.

(56) References Cited

U.S. PATENT DOCUMENTS 9,538,175 B2    1/2017  Karczewicz et al.
9,621,894 B2    4/2017  Seregin et al.
(Continued)

FOREIGN PATENT DOCUMENTS

WO    2013106739 A2    7/2013
WO    2017191782 A1    11/2017
(Continued)

OTHER PUBLICATIONS

Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

*Primary Examiner* — Zhubing Ren
(74) *Attorney, Agent, or Firm* — Shumaker & Sieffert, P. A.

(57) ABSTRACT

A video decoder determines, based on a block size of a current block and a low-frequency non-separable transform (LFNST) syntax element, a zero-out pattern of normatively defined zero-coefficients. The LFNST syntax element is signaled at a transform unit (TU) level. Additionally, the video decoder determines transform coefficients of the current block. The transform coefficients of the current block include transform coefficients in an LFNST region of the current block and transform coefficients outside the LFNST region of the current block. As part of determining the transform coefficients of the current block, the video decoder applies an inverse LFNST to determine values of one or more transform coefficients in the LFNST region of the
(Continued)

DECODER SIDE current block. The video decoder also determines that transform coefficients of the current block in a region of the current block defined by the zero-out pattern are equal to 0.

9 Claims, 15 Drawing Sheets

Related U.S. Application Data

(60) Provisional application No. 62/868,346, filed on Jun. 28, 2019, provisional application No. 62/861,828, filed on Jun. 14, 2019.

(51) Int. Cl.
*H04N 19/176* (2014.01)
*H04N 19/18* (2014.01)
*H04N 19/186* (2014.01)
*H04N 19/70* (2014.01)

(52) U.S. Cl.
CPC ........... *H04N 19/18* (2014.11); *H04N 19/186* (2014.11); *H04N 19/70* (2014.11)

(56) References Cited

U.S. PATENT DOCUMENTS

| | | | |
|---|---|---|---|
| 10,306,229 B2 | 5/2019 | Zhao et al. | |
| 10,349,085 B2 | 7/2019 | Said et al. | |
| 10,448,053 B2 | 10/2019 | Said et al. | |
| 10,491,922 B2 | 11/2019 | Zhao et al. | |
| 10,681,379 B2 | 6/2020 | Zhao et al. | |
| 11,032,572 B2 | 6/2021 | Egilmez et al. | |
| 2013/0272379 A1 | 10/2013 | Sole et al. | |
| 2013/0272423 A1 | 10/2013 | Chien et al. | |
| 2014/0056362 A1* | 2/2014 | Mrak | H04N 19/61 375/240.18 |
| 2017/0094314 A1 | 3/2017 | Zhao et al. | |
| 2018/0020218 A1 | 1/2018 | Zhao et al. | |
| 2018/0176587 A1 | 6/2018 | Panusopone et al. | |
| 2018/0302631 A1 | 10/2018 | Chiang et al. | |
| 2019/0297351 A1 | 9/2019 | Said et al. | |
| 2019/0373261 A1 | 12/2019 | Egilmez et al. | |
| 2019/0387241 A1* | 12/2019 | Kim | H04N 19/625 |
| 2020/0092583 A1 | 3/2020 | Zhao et al. | |
| 2020/0162729 A1* | 5/2020 | Lee | H04N 19/46 |
| 2020/0304782 A1 | 9/2020 | Zhao et al. | |
| 2020/0322636 A1 | 10/2020 | Egilmez et al. | |
| 2020/0366937 A1 | 11/2020 | Egilmez et al. | |
| 2020/0389661 A1* | 12/2020 | Zhao | H04N 19/44 |
| 2020/0396487 A1 | 12/2020 | Nalci et al. | |
| 2022/0224898 A1* | 7/2022 | Chiang | H04N 19/167 |

FOREIGN PATENT DOCUMENTS

| | | |
|---|---|---|
| WO | 2017192705 A1 | 11/2017 |
| WO | 2018013706 A1 | 1/2018 |
| WO | 2019185883 A1 | 10/2019 |
| WO | 2020036390 A1 | 2/2020 |
| WO | 2020067694 A1 | 4/2020 |
| WO | 2020211776 A1 | 10/2020 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC JTC 1/SC 29/WG 11, 14th Meeting, Geneva, CH, Mar. 19-27, 2019, JVET-N1010-v1, pp. 1-6.
Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, May 19, 2019-May 27, 2019, No. JVET-N1001, May 14, 2019 (May 14, 2019), XP030205193, 370 Pages, pp. 94-98, paragraph 7.4.6.3., Section 8.5.6.4; p. 212-p. 214.
Bross B., et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, Jun. 11, 2019, XP030212626, Section 8.4.5.2.11 Specification of Intra DC intra prediction mode Section 8.7.5 Picture reconstruction process.
Chen J., et al., "Algorithm Description for Versatile Video Coding and Test Model 5 (VTM 5)", 14th JVET Meeting, Mar. 19, 2019-Mar. 27, 2019, Geneva, (The Joint Video Exploration Team of ISO/IEC JTC1/SC29/WG11 and ITU-T SG.16 WP 3), No. JVET-N1002-v1, May 21, 2019, XP030205194, 70 Pages, Retrieved from the Internet: URL: http://phenix.int-evry.fr/jvet/doc_end_user/documents/14_Geneva/wg11/JVET-N1002-v1.zip JVET-N1002-v1.docx.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.
Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, 48 Pages.
Chiang M-S., et al., "CE6-Related: Latency Reduction for LFNST Signalling", 15th JVET Meeting, Jul. 3, 2019-Jul. 12, 2019, Gothenburg, (The Joint Video Exploration Team of ISO/IEC JTC1/SC29/WG11 and ITU-TSG. 16), No. JVET-O0293-v1, Jun. 25, 2019 (Jun. 25, 2019), XP030219143, 6 pages, Introduction; p. 1, paragraph 1—p. 2 Proposed methods; p. 2, paragraph 2—p. 3.
Fraunhofer HHI., "Transform Coding Using the Residual Quadtree (RQT)", retrieved from: http://www.hhi.fraunhofer.de/fields-of-competence/image-processing/research-groups/image-video-coding/hevc-high-efficiency-video-coding/transform-coding-using-the-residual-quadtree-rqt.html, Mar. 6, 2017, pp. 1-4.
Han J., et al., "Towards Jointly Optimal Spatial Prediction and Adaptive Transform in Video/Image Coding", IEEE International Conference on Acoustics, Speech and Signal Processing (ICASSP), Mar. 14, 2010, pp. 726-729.
International Preliminary Report on Patentability—PCT/US2020/037459, the International Bureau of WIPO—Geneva, Switzerland, Dec. 23, 2021.
International Search Report and Written Opinion—PCT/US2020/032866—ISAEPO—Sep. 2, 2020.
International Search Report and Written Opinion—PCT/US2020/037459—ISA/EPO—Sep. 25, 2020.
ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.
ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.
ITU-T H.265: "Series H: Audiovisual and Multimedia Systems Infrastructure of Audiovisual Services—Coding of Moving Video", High Efficiency Video Coding, the International Telecommunication Union, Jun. 2019, 696 Pages.
Jain A.K., "A Sinusoidal Family of Unitary Transforms", IEEE Transactions on Pattern Analysis and Machine Intelligence, IEEE Service Center, vol. PAMI-1, No. 4, Oct. 1, 1979, XP011242370, pp. 356-365, ISSN: 0162-8828.
Jung J., et al., "On LFNST in Shared Tree", JVET-R0352-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-4.

(56) References Cited

OTHER PUBLICATIONS

Jung (Wi lusGroup) J., et al., "Non-CE6: Simplified LFNST Signalling", 15. JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0472, Jul. 11, 2019 (Jul. 11, 2019), XP030219674, Retrieved from the Internet: URL: http://phenix.int-evry.fr/jvet/doc_end_user/documents/15_Gothenburg/wg11/JVET-O0472-v6.zip JVET-O0472-v5.docx, [retrieved on Jul. 11, 2019], Sections 1 and 2.
Jung (WilusGroup) J., et al., "Non-CE6: Simplified LFNST Signalling", 15 . JVET Meeting, Jul. 3, 2019-Jul. 12, 2019, Gothenburg, (The Joint Video Exploration Team of ISO/IEC JTC1/SC29/WG11 and ITU-T SG . 16 ), No. JVET-O0472, Jun. 25, 2019 (Jun. 25, 2019), XP030219672, 4 pages, Retrieved from the Internet : URL : http://phenix.int-evry.fr/jvet/doc_end_user/documents/15_Gothenburg/wg11/JVET-O0472-v2.zip JVET-O0472-v2.docx [retrieved on Jun. 25, 2019] section 2.
Koo (LGE) M., "Crosscheck of JVET-N0555 (CE6-Related: Simplification of the Reduced Secondary Transform)", 14. JVET Meeting, Mar. 19, 2019-Mar. 27, 2019, Geneva, (The Joint Video Exploration Team of ISO/IEC JTC1/SC29/WG11 and ITU-T SG. 16), No. JVET-N0812, Mar. 24, 2019 (Mar. 24, 2019), XP030256659, pp. 1-3, Section 1.
Koo (LGE) M., et al., "CE6: Reduced Secondary Transform (RST) (CE6-3.1)", 14th JVET Meeting, Mar. 19, 2019-Mar. 27, 2019, Geneva, CH (The Joint Video Exploration Team of ISO/IEC JTC1/SC29/WG11 and ITU-T SG. 16 WP 3), No. JVET-N0193, Mar. 27, 2019 (Mar. 27, 2019), XP030256927, pp. 1-19, Section 1 last paragraph, Section 2 and Section 3 first sentence, in particular Section 2.4.
Koo, M., et al., "CE 6-2.1: Reduced Secondary Transform (RST)", JVET-L0133, Joint Video Experts Team (JVET) of ITU-T SG 16 WP 3 and ISO/IEC JTC 1/SC 29/WG 11, 12th Meeting, Macao, CN, Oct. 3-12, 2018, pp. 1-8.
Martucci S.A., et al., "Symmetric Convolution and the Discrete Sine and Cosine Transforms", IEEE Transactions on Signal Processing, IEEE Signal Processing Society, vol. 42, No. 5, May 1, 1994, XP000863873, pp. 1038-1051.
Nalci A., et al., "Non-CE6: Combination of JVET-O0472 and JVET-O0569 for TU-level LFNST Signaling with Last Position Constraints", 15. JVET Meeting, Jul. 3, 2019-Jul. 12, 2019, Gothenburg, (The Joint Video Exploration Team of ISO/IEC JTC1/SC29/WG11 and ITU-TSG. 16), No. JVET-O0963, Jul. 10, 2019 (Jul. 10, 2019), XP030220593, 10 Pages, Sections 2 and 4.
Nalci (Qualcomm) A., et al., "Non-CE6: LFNST Signaling at the TU Level", 15. JVET Meeting, Jul. 3, 2019-Jul. 12, 2019, Gothenburg, (The Joint Video Exploration Team of ISO/IEC JTC1/SC29/WG11 and ITU-TSG.16 ), No. JVET-O0569, Jun. 27, 2019 (Jun. 27, 2019), XP030219931, 6 pages, Retrieved from the Internet: URL: http://phenix.int-evry.fr/jvet/doc_end_user/documents/15_Gothenburg/wg11/JVET-O0569-v2.zip JVET-O0569-v2.docx [retrieved on Jun. 27, 2019] section 2.
Rosewarne C., et al., "On Chroma LFNST", JVET-R0176_r1, Joint Video Experts Team (JVET) of ITU-T SG 16 WP B and ISO/IEC JTC 1/SC 29/WG 11, 18th Meeting, by Teleconference, Apr. 15-24, 2020, pp. 1-16.
Salehifar, M., "CE 6.2.6: Reduced Secondary Transform (RST)", JVET-K0099, Joint Video Experts Team (JVET) of ITU-T SG 16 WP 3 and ISO/IEC JTC 1/SC 29/WG 11, 11th Meeting, Ljubljana, SI, Jul. 10-18, 2018, pp. 1-12.
Siekmann (Fraunhofer) M., et al., "CE6-2.1: Simplification of Low-Frequency Non-Separable Transform", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0094, Jun. 18, 2019 (Jun. 18, 2019), XP030205632, 7 Pages, sections 1 and 2.
Siekmann (Fraunhofer) M., et al., "CE6-Related: Simplification of the Reduced Secondary Transform", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0555, Mar. 23, 2019 (Mar. 23, 2019), XP030204685, 9 pages, Abstract, Section 2 with figure 2 and section 5, First Sentence, sections 1-2figure 1.
Siekmann M., et al., "CE6-2.1: Simplification of Low Frequency Non-Separable Transform", Joint Video Experts Team (JVET) of ITU-T SG 16 WP 3 and ISO/IEC JTC 1/SC 29/WG 11, JVET-O0094-r1, 15th Meeting: Gothenburg, SE, Jul. 3-12, 2019, 8 pages.
Tsukuba (Sony) T., et al., "Non-CE6 : TU/TB-level LFNST Index Coding," 127 . MPEG Meeting, Jul. 8, 2019-Jul. 12, 2019, Gothenburg; (Motion Picture Expert Group or ISO/IEC JTC1/SC29/WG11), No. m48470, Jun. 26, 2019 (Jun. 26, 2019), XP030222080, 8 pages, Retrieved from the Internet : URL: http:/phenix.int-evry.fr/mpeg/doc_end_user/documents/127_Gothenburg/wg11/m48470-JVET-O0352-v1-JVET-O0352.zip JVET-O0352.docx [retrieved on Jun. 26, 2019] section 2.
U.S. Appl. No. 15/931,271, filed May 13, 2020, 54 Pages.
U.S. Appl. No. 62/668,105, filed May 7, 2018, by Amir Said, 44 Pages.
U.S. Appl. No. 62/799,410, filed Jan. 31, 2019, by Hilmi Enes Egilmez et al., 34 Pages.
U.S. Appl. No. 62/830,125, filed Apr. 5, 2019, 52 Pages.
U.S. Appl. No. 62/849,689, filed May 17, 2019, 35 Pages.
Wien M., "High Efficiency Video Coding, Coding Tools and Specification", Chapter 5, Springer-Verlag, Berlin, 2015, 30 Pages.
Xiu X., et al., "Constrained MTS Signaling Based on the Position of Last Significant Coefficient", JVET-Q0516_r1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.
Zhao (Qualcomm) X., et al., "EE2.7: TU-level Non-separable Secondary Transform", 3. JVET Meeting, May 26, 2016-Jun. 1, 2016, Geneva; (The Joint Video Exploration Team of ISO/IEC JTC1/SC29/WG11 and ITU-T SG.16 ), No. JVET-C0053, May 17, 2016 (May 17, 2016), XP030150151, 10 pages, section 1 section 2.1.
Zhao X., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-M1026-v4, 13th Meeting: Marrakech, MA, Jan. 9-18, 2019, 9 pages.
Zhao X., et al., "Enhanced Multiple Transform for Video Coding", Data Compression Conference, Mar. 30, 2016, XP033027689, pp. 73-82, DOI: 10.1109/DCC.2016.9 [retrieved on Dec. 15, 2016].
Zhou M., et al., "CE6-related: A Study of Primary Transforms", Joint Video ExpertsTeam (JVET) of ITU-T SG 16 WP 3 and ISO/IEC JTC 1/SC 29/WG 11, 13th Meeting: Marrakesh, MA, Jan. 9-18, 2019, Document: JVET-M0046-v2, pp. 1-12.
High-Level Syntax, Signals and Communication Technology, High Efficiency Video Coding, Chapter 5, Sep. 30, 2014, pp. 133-160.
Chen J., et al., "Algorithm description for Versatile Video Coding and Test Model 5 (VTM 5)", Joint Video Experts Team (JVET), of ITU-T SG 16 WP 3 and ISO/IEC JTC 1/SC 29/WG 11, 14. JVET Meeting, Mar. 19, 2019-Mar. 27, 2019, Geneva, No. JVET-N1002, Jun. 2019, XP030205562, pp. 1-76.
Chiang M-S., et al., "CE6-Related: Latency Reduction for LFNST Signalling", 15th JVET Meeting, Jul. 3, 2019-Jul. 12, 2019, Gothenburg, (The Joint Video Exploration Team of ISO/IEC JTC1/SC29/WG11 and ITU-TSG. 16), No. JVET-O0293-v1, Jun. 25, 2019, XP030219143, 6 pages.
Jung (WilusGroup) J., et al., "Non-CE6: Simplified LFNST Signalling", 15 . JVET Meeting, Jul. 3, 2019-Jul. 12, 2019, Gothenburg, (The Joint Video Exploration Team of ISO/IEC JTC1/SC29/WG11 and ITU-T SG . 16 ), No. JVET-O0472, Jun. 25, 2019 (Jun. 25, 2019), XP030219672, 4 pages.
Koo (LGE) M., et al., "CE6: Reduced Secondary Transform (RST) (CE6-3.1)", 14th JVET Meeting, Mar. 19, 2019-Mar. 27, 2019, Geneva, CH (The Joint Video Exploration Team of ISO/IEC JTC1/SC29/WG11 and ITU-T SG. 16 WP 3), No. JVET-N0193, Mar. 27, 2019, XP030256927, pp. 1-19.
Nalci A., et al., "Non-CE6: Combination of JVET-O0472 and JVET-O0569 for TU-level LFNST Signaling with Last Position Constraints", 15. JVET Meeting, Jul. 3, 2019-Jul. 12, 2019, Gothenburg,

(56) References Cited

OTHER PUBLICATIONS (The Joint Video Exploration Team of ISO/IEC JTC1/SC29/WG11 and ITU-TSG. 16), No. JVET-O0963, Jul. 10, 2019, XP030220593, 10 Pages.

Nalci (Qualcomm) A., et al., "Non-CE6: LFNST Signaling at the TU Level", 15. JVET Meeting, Jul. 3, 2019-Jul. 12, 2019, Gothenburg, (The Joint Video Exploration Team of ISO/IEC JTC1/SC29/WG11 and ITU-TSG. 16 ), No. JVET-O0569, Jun. 27, 2019, XP030219931, 6 pages.

Siekmann (Fraunhofer) M., et al., "CE6-2.1: Simplification of Low-Frequency Non-Separable Transform", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0094, Jun. 18, 2019, XP030205632, 7 Pages.

Siekmann (Fraunhofer) M., et al., "CE6-Related: Simplification of the Reduced Secondary Transform", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0555-V3, Mar. 23, 2019, XP030204685, 9 pages.

Tsukuba (Sony) T., et al., "Non-CE6 : TU/TB-level LFNST Index Coding," 127 . MPEG Meeting, Jul. 8, 2019-Jul. 12, 2019, Gothenburg; (Motion Picture Expert Group or ISO/IEC JTC1/SC29/WG11), No. m48470, Jun. 26, 2019, XP030222080, 8 pages.

Zhao (Qualcomm) X., et al., "EE2.7: TU-level Non-separable Secondary Transform", 3. JVET Meeting, May 26, 2016-Jun. 1, 2016, Geneva; (The Joint Video Exploration Team of ISO/IEC JTC1/SC29/WG11 and ITU-T SG. 16 ), No. JVET-C0053, May 17, 2016, XP030150151, 10 pages.

Chen J., et al., "Algorithm Description for Versatile Video Coding and Test Model 5 (VTM 5)", 126th MPEG Meeting, Mar. 19, 2019-Mar. 27, 2019, Geneva, (Motion Picture Expert Group or ISO/IEC JTC1/SC29/WG11), No. m48054, 14th Meeting, Joint Video Experts Team (JVET) of ITU-T SG 16 WP 3 and ISO/IEC JTC 1/SC 29/WG 11, JVET-N1002-v2, Jun. 11, 2019 (Jun. 11, 2019), XP030212630, 76 pages.

Koo M (LG Electronics)., "Crosscheck of JVET-N0555 (CE6-Related: Simplification of the Reduced Secondary Transform)", 14. JVET Meeting, Mar. 19, 2019-Mar. 27, 2019, Geneva, (The Joint Video Exploration Team of ISO/IEC JTC1/ SC29/WG11 and ITU-T SG.16), No. JVET-N0812, Mar. 24, 2019 (Mar. 24, 2019), XP030256659, pp. 1-3.

\* cited by examiner

ND SIGNIFICANT
TRANSFORM AND LAST SIGNIFICANT COEFFICIENT POSITION SIGNALING FOR LOW-FREQUENCY NON-SEPARABLE TRANSFORM IN VIDEO CODING

This application is a continuation of U.S. patent application Ser. No. 16/899,063, filed Jun. 11, 2020, which claims the benefit of U.S. Provisional Patent Application 62/861,828, filed Jun. 14, 2019, and U.S. Provisional Patent Application 62/868,346, filed Jun. 28, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling of last transform coefficient position and transform indices/flags. This disclosure describes: (i) a location-based restriction for signaling of the last transform coefficient position in transform coefficient coding, and (ii) methods for signaling of the transform indices for Low-Frequency Non-separable Transforms (LFNSTs). Because the techniques described in this disclosure may reduce the signaling overhead, the techniques of this disclosure may improve coding efficiency and may be used in advanced video codecs including extensions of HEVC and the next generation of video coding standards, such as Versatile Video Coding (VVC/H.266).

In one example, this disclosure describes a method of decoding video data, the method comprising: determining, based on a block size of a current block and a low-frequency non-separable transform (LFNST) syntax element, a zero-out pattern of normatively defined zero-coefficients, wherein the LFNST syntax element is signaled at a transform unit (TU) level; determining transform coefficients of the current block, wherein the transform coefficients of the current block include transform coefficients in an LFNST region of the current block and transform coefficients outside the LFNST region of the current block, and determining the transform coefficients of the current block comprises: applying an inverse LFNST to determine values of one or more transform coefficients in the LFNST region of the current block; and determining that transform coefficients of the current block in a region of the current block defined by the zero-out pattern are equal to 0; applying an inverse transform to the transform coefficients of the current block to determine residual data for the current block; and reconstructing the current block based on the residual data for the current block.

In another example, this disclosure describes a method of encoding video data, the method comprising: generating residual data for a current block of the video data; applying a transform to the residual data to generate first transform coefficients for the current block; determining a zero-out pattern of normatively defined zero-out transform coefficients; determining second transform coefficients of the current block, wherein the current block includes a low-frequency non-separable transform (LFNST) region, and determining the second transform coefficients of the current block comprises: applying a LFNST to determine values of one or more second transform coefficients in the LFNST region of the current block; and determining that the second transform coefficients of the current block in a region of the block defined by the zero-out pattern are equal to 0; determining a LFNST syntax element, wherein the LFNST syntax element in combination with a mode of the current block and a size of the current block specifies the LFNST; and signaling the LFNST syntax element at a transform unit (TU) level.

In another example, this disclosure describes a device for decoding video data, the device comprising: a memory to store the video data; and one or more processors implemented in circuitry, the one or more processors configured to: determine, based on a block size of a current block and a low-frequency non-separable transform (LFNST) syntax element, a zero-out pattern of normatively defined zero-coefficients, wherein the LFNST syntax element is signaled at a transform unit (TU) level; determine transform coefficients of the current block, wherein the transform coefficients of the current block include transform coefficients in an LFNST region of the current block and transform coefficients outside the LFNST region of the current block, and the one or more processors are configured such that, as part of determining the transform coefficients of the current block, the one or more processors: apply an inverse LFNST to determine values of one or more transform coefficients in the LFNST region of the current block; and determine that transform coefficients of the current block in a region of the current block defined by the zero-out pattern are equal to 0; apply an inverse transform to the transform coefficients of the current block to determine residual data for the current block; and reconstruct the current block based on the residual data for the current block.

In another example, this disclosure describes a device for encoding video data, the device comprising: a memory to store the video data; and one or more processors implemented in circuitry, the one or more processors configured to: generate residual data for a current block of the video data; apply a transform to the residual data to generate first transform coefficients for the current block; determine a zero-out pattern of normatively defined zero-out transform coefficients; determine second transform coefficients of the current block, wherein the current block includes a low-frequency non-separable transform (LFNST) region, and the one or more processors are configured such that, as part of determining the second transform coefficients of the current block, the one or more processors: apply a LFNST to determine values of one or more second transform coefficients in the LFNST region of the current block; and determine that the second transform coefficients of the current block in a region of the block defined by the zero-out pattern are equal to 0; determine a LFNST syntax element, wherein the LFNST syntax element in combination with a mode of the current block and a size of the current block specifies the LFNST; and signal the LFNST syntax element at a transform unit (TU) level.

In another example, this disclosure describes a device of decoding video data, the device comprising: means for determining, based on a block size of a current block and a low-frequency non-separable transform (LFNST) syntax element, a zero-out pattern of normatively defined zero-coefficients, wherein the LFNST syntax element is signaled at a transform unit (TU) level; means for determining transform coefficients of the current block, wherein the transform coefficients of the current block include transform coefficients in an LFNST region of the current block and transform coefficients outside the LFNST region of the current block, and the means for determining the transform coefficients of the current block comprises: means for applying an inverse LFNST to determine values of one or more transform coefficients in the LFNST region of the current block; and means for determining that transform coefficients of the current block in a region of the current block defined by the zero-out pattern are equal to 0; means for applying an inverse transform to the transform coefficients of the current block to determine residual data for the current block; and means for reconstructing the current block based on the residual data for the current block.

In another example, this disclosure describes a device for encoding video data, the device comprising: means for generating residual data for a current block of the video data; means for applying a transform to the residual data to generate first transform coefficients for the current block; means for determining a zero-out pattern of normatively defined zero-out transform coefficients; means for determining second transform coefficients of the current block, wherein the current block includes a low-frequency non-separable transform (LFNST) region, and the means for determining the second transform coefficients of the current block comprises: means for applying a LFNST to determine values of one or more second transform coefficients in the LFNST region of the current block; and means for determining that the second transform coefficients of the current block in a region of the block defined by the zero-out pattern are equal to 0; means for determining a LFNST syntax element, wherein the LFNST syntax element in combination with a mode of the current block and a size of the current block specifies the LFNST; and means for signaling the LFNST syntax element at a transform unit (TU) level.

In another example, this disclosure describes a computer-readable data storage medium having instructions stored thereon that, when executed, cause one or more processors to: determine, based on a block size of a current block and a low-frequency non-separable transform (LFNST) syntax element, a zero-out pattern of normatively defined zero-coefficients, wherein the LFNST syntax element is signaled at a transform unit (TU) level; determine transform coefficients of the current block, wherein the transform coefficients of the current block include transform coefficients in an LFNST region of the current block and transform coefficients outside the LFNST region of the current block, and the instructions that cause the one or more processors to determine the transform coefficients of the current block cause the one or more processors to: apply an inverse LFNST to determine values of one or more transform coefficients in the LFNST region of the current block; and determine that transform coefficients of the current block in a region of the current block defined by the zero-out pattern are equal to 0; apply an inverse transform to the transform coefficients of the current block to determine residual data for the current block; and reconstruct the current block based on the residual data for the current block.

In another example, this disclosure describes a computer-readable data storage medium having instructions stored thereon that, when executed, cause one or more processors to: generate residual data for a current block of the video data; apply a transform to the residual data to generate first transform coefficients for the current block; determine a zero-out pattern of normatively defined zero-out transform coefficients; determine second transform coefficients of the current block, wherein the current block includes a low-frequency non-separable transform (LFNST) region, and the instructions that cause the one or more processors to determine the second transform coefficients of the current block cause the one or more processors to: apply a LFNST to determine values of one or more second transform coefficients in the LFNST region of the current block; and determine that the second transform coefficients of the current block in a region of the block defined by the zero-out pattern are equal to 0; determine a LFNST syntax element, wherein the LFNST syntax element in combination with a mode of the current block and a size of the current block specifies the LFNST; and signal the LFNST syntax element at a transform unit (TU) level.

The details of one or more examples are set forth in the accompanying drawings and the description below. Other features, objects, and advantages will be apparent from the description, drawings, and claims.

DETAILED DESCRIPTION

Figure 1:
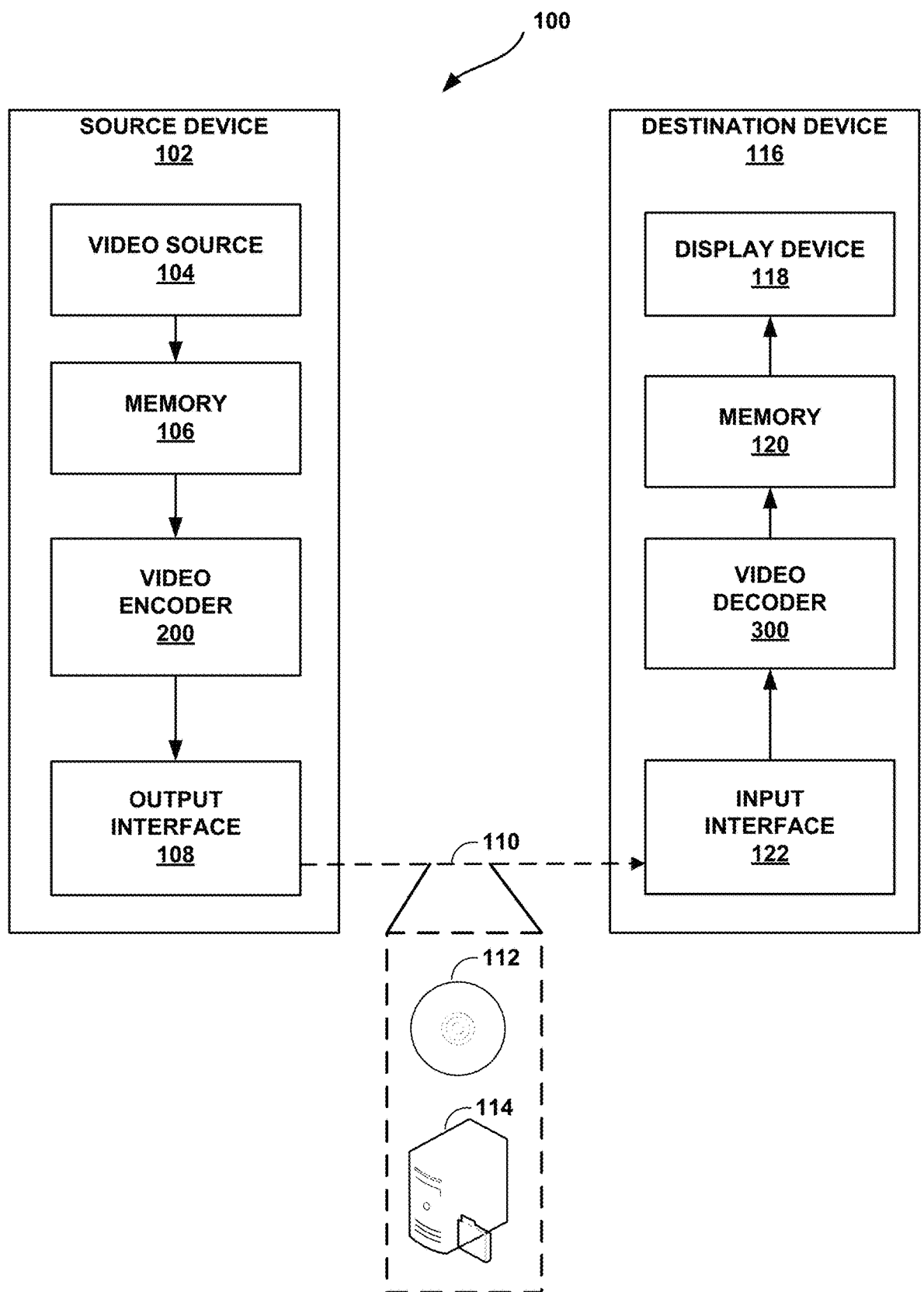
FIG. 1 is a block diagram illustrating an example video encoding and decoding system that may perform the techniques of this disclosure.

As part of performing a video encoding process, a video encoder may apply a transform to a block of residual data to generate a transform coefficient block. The transform converts the residual data to a frequency domain. For example, a video encoder may apply one or more separable transforms to a block of residual data. Additionally, in some instances, the video encoder may apply a low-frequency non-separable transform (LFNST) to a sub-block of the transform coefficient block. The video encoder may then quantize the transform coefficients resulting from application of the LFNST. The video encoder may then encode syntax elements representing the quantized transform coefficients. Similarly, a video decoder may inverse quantize transform coefficients and apply an inverse LFNST to the sub-block of the inverse quantized transform coefficients. The video decoder may then generate residual data by applying an inverse transform to the transform coefficients resulting from the inverse LFNST. The inverse transform converts the transform coefficients from the frequency domain to a residual domain. The video decoder may reconstruct a block of video data based on the residual data and a prediction block.

In some examples, when applying the LFNST to the transform coefficients, the video encoder keeps and transforms the k-lowest frequency transform coefficients in the sub-block, while zeroing-out the rest of the transform coefficients in the sub-block. When the video encoder keeps the k-lowest frequency transform coefficients, the video encoder does not zero-out the k-lowest frequency transform coefficients. In such examples, the video coder does not normatively zero-out transform coefficients that are outside the sub-block. In other examples, when applying the LFNST to the transform coefficients, the video encoder does not zero-out transform coefficients in the sub-block or transform coefficients outside the sub-block. In other examples, when applying the LFNST to the transform coefficients, the video encoder keeps and transforms the k-lowest frequency transform coefficients in the sub-block while zeroing-out all remaining transform coefficients of the block including transform coefficients inside and outside of the sub-block.

Bross et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v8 (hereinafter "VVC Draft 5") is a recent draft of the upcoming VVC standard. In VVC Draft 5, the video encoder signals an LFNST index that indicates whether LFNST is used and, if so, which one of two non-separable transform kernels in a selected transform set is used.

Furthermore, in VVC Draft 5, the video encoder signals a position of a last-significant transform coefficient of the block. In this disclosure, a transform coefficient is a significant transform coefficient if the transform coefficient is non-zero. Signaling the position of the last significant transform coefficient may enable the video decoder to determine how many transform coefficients are signaled for the block. Additionally, in VVC Draft 5, the block may be partitioned into coefficient groups (CGs). The video encoder may signal a flag (e.g., a coded sub-block flag) for each of the CGs to indicate whether or not the CG includes any non-zero transform coefficients. CGs that include one or more non-zero transform coefficients may be referred to as "coded CGs." CGs that do not include any non-zero transform coefficients may be referred to as "non-coded CGs."

This disclosure describes techniques in which the video encoder and the video decoder may infer (e.g., determine without explicitly coding syntax elements) a pattern of transform coefficients to zero out and, based on the determined zero-out pattern, infer a position of the last significant transform coefficient or at least infer bounds within which the last significant transform coefficient must be. In this way, the video encoder may be able to skip signaling of the position of the last significant transform coefficient. Skipping signaling of the position of the last significant transform coefficient may reduce the number of bits that the video encoder includes in a bitstream that contains an encoded representation of the video data. In this way, the techniques of this disclosure may increase coding efficiency.

In one example, this disclosure describes a video encoder configured to generate residual data for a current block of the video data. Additionally, the video encoder is configured to apply a transform to the residual data to generate first transform coefficients for the current block. The video encoder is also configured to determine a LFNST syntax element and signal the LFNST syntax element at a transform unit (TU) level. The LFNST syntax element indicates whether LFNST is applied and, if so, an applicable LFNST kernel. Furthermore, the video encoder may be configured to determine, based on a block size of the current block and the applicable LFNST kernel, a zero-out pattern of normatively defined zero-coefficients. The video encoder may also be configured to determine second transform coefficients of the current block. The current block includes an LFNST region. The LFNST region is a sub-block of the current block. As part of determining the second transform coefficients of the current block, the video encoder may apply an LFNST to determine values of one or more second transform coefficients in the LFNST region of the current block. Additionally, the video encoder may be configured such that, as part of determining the second transform coefficients of the current block, the video encoder determines that second transform coefficients of the current block in a region of the block defined by the zero-out pattern are equal to 0.

Similarly, in accordance with one or more techniques of this disclosure, a video decoder may be configured to determine, based on a block size of a current block and a LFNST syntax element, a zero-out pattern of normatively defined zero-coefficients. In this example, the LFNST syntax element is signaled at a TU level. In other examples, the LFNST syntax element may be signaled at a CU level or another level. Furthermore, the video decoder may be configured to determine transform coefficients of the current block. The transform coefficients of the current block include transform coefficients in an LFNST region of the current block and transform coefficients outside the LFNST region of the current block. The video decoder may be configured such that, as part of determining the transform coefficients of the current block, the video decoder may apply an inverse LFNST to determine values of one or more transform coefficients in the LFNST region of the current block. The video decoder may be further configured to determine that transform coefficients of the current block in a region of the current block defined by the zero-out pattern are equal to 0. The video decoder may also be configured to apply an inverse transform to the transform coefficients of the current block to determine residual data for the current block. Additionally, the video decoder may be configured to reconstruct the current block based on the residual data for the current block. Because the zero-out pattern can be determined based on the block size of the current block and the LFNST syntax element, it may be unnecessary to explicitly signal the zero-out pattern. Moreover, as described in this disclosure, the last significant coefficient of the current block may be restricted to be a position that is not zeroed-out by the zero-out pattern. This may reduce the need to signal the position of the last significant coefficient.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling of last transform coefficient position and transform indices/flags. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling of last transform coefficient position and transform indices/flags. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. In VVC, the acronym PU refers to a "picture unit." CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 may generate residual data for a current block of the video data. Video encoder 200 may also apply a transform to the residual data to generate first transform coefficients for the current block. Video encoder 200 may also determine a zero-out pattern of normatively defined zero-coefficients. Additionally, video encoder 200 may determine second transform coefficients of the current block. The current block includes an LFNST region and to determine the second transform coefficients of the current block, video encoder 200 may apply a LFNST to determine values of one or more second transform coefficients in the LFNST region of the current block. Furthermore, as part of determining the second transform coefficients of the current block, video encoder 200 may determine that second transform coefficients of the current block in a region of the block defined by the zero-out pattern are equal to 0. Video encoder 200 may also determine a LFNST syntax element, such as an LFNST index or LFNST flag. The LFNST syntax element specifies the LFNST. In other words, video decoder 300 may determine the LFNST based on the LFNST syntax element. For instance, video decoder 300 may determine the LFNST based on the LFNST syntax element in combination with a mode (e.g., an intra prediction mode) of the current block and a size of the current block. Video encoder 200 may signal the LFNST syntax element, e.g., at a TU level.

Furthermore, in accordance with the techniques of this disclosure, video decoder 300 may determine, based on a block size of a current block and a LFNST syntax element, a zero-out pattern of normatively defined zero-coefficients. Video decoder 300 may determine transform coefficients of the current block. The transform coefficients of the current block include transform coefficients in an LFNST region of the current block and transform coefficients outside the LFNST region of the current block. In this example, as part of determining the transform coefficients of the current block, video decoder 300 may apply an inverse LFNST to determine values of one or more transform coefficients in the LFNST region of the current block. Additionally, video decoder 300 may determine that transform coefficients of the current block in a region of the current block defined by the zero-out pattern are equal to 0. Video decoder 300 may apply an inverse transform to the transform coefficients of the current block to determine residual data for the current block. Video decoder 300 may reconstruct the current block based on the residual data for the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
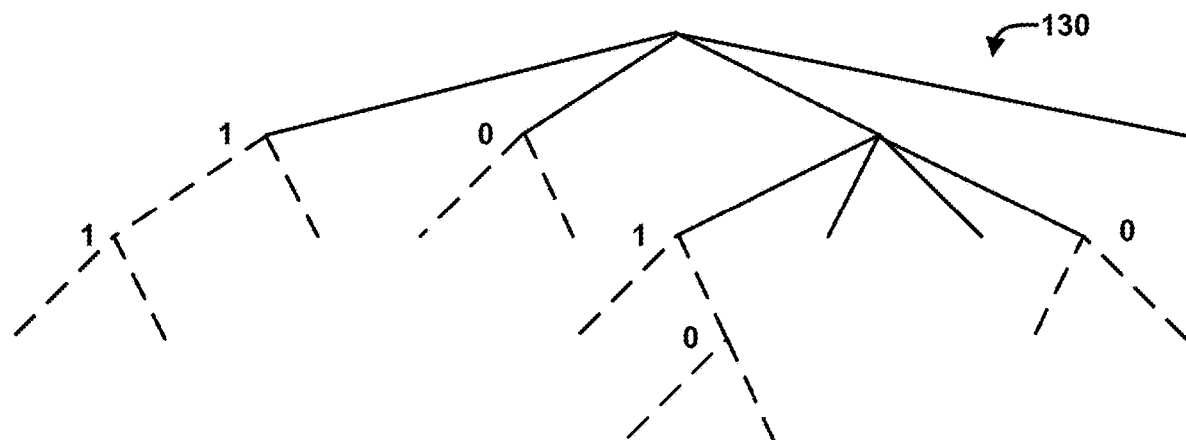
FIGS. 2A and 2B are conceptual diagrams illustrating an example quadtree binary tree (QTBT) structure, and a corresponding coding tree unit (CTU).
Figure 2B:
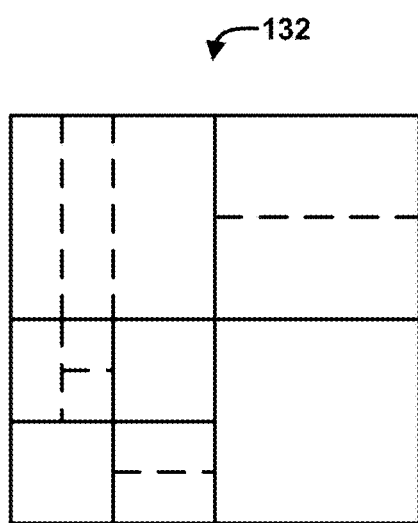

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have sizes from 16×16 (i.e., the MinQTSize) to 128× 128 (i.e., the CTU size). If the quadtree leaf node is 128×128, the quadtree leaf node will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

As mentioned above, video encoder 200 may apply a transform to a block of residual data to generate a transform coefficient block. Likewise, video decoder 300 may apply an inverse transform to convert a transform coefficient block into a block of residual data. In video coding standards prior to HEVC, only a fixed separable transform is used where DCT-2 is used both vertically and horizontally. In HEVC, in addition to DCT-2, DST-7 is also employed for 4×4 blocks as a fixed separable transform.

U.S. Pat. No. 10,306,229, U.S. Patent Publication No. 2018/0020218, and U.S. Patent Publication 2019/0373261 (U.S. patent application Ser. No. 16/426,749, filed May 30, 2019) describe multiple transform selection (MTS) methods. An example of MTS in U.S. Patent Publication 2019/0373261 was adopted in the Joint Experimental Model (JEM-7.0) of the Joint Video Experts Team (JVET), and later a simplified version of MTS is adopted in VVC. MTS is previously called Adaptive Multiple Transforms (AMT), which is only a name change and the technique is the same.

Figure 3A:
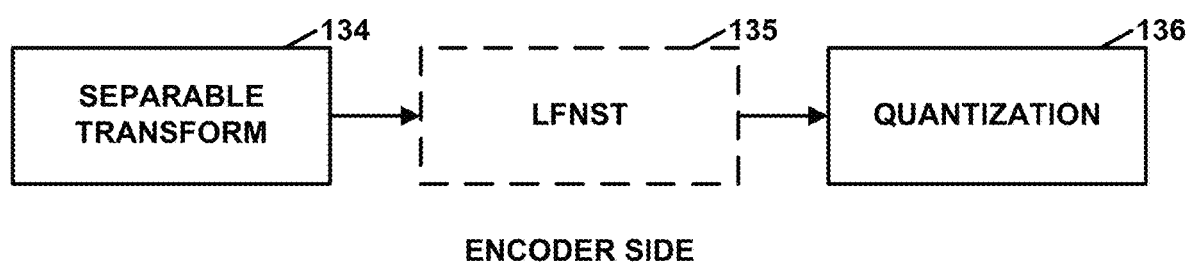
FIG. 3A is an illustration of a low-frequency non-separable transform (LFNST) at a video encoder.
Figure 3B:
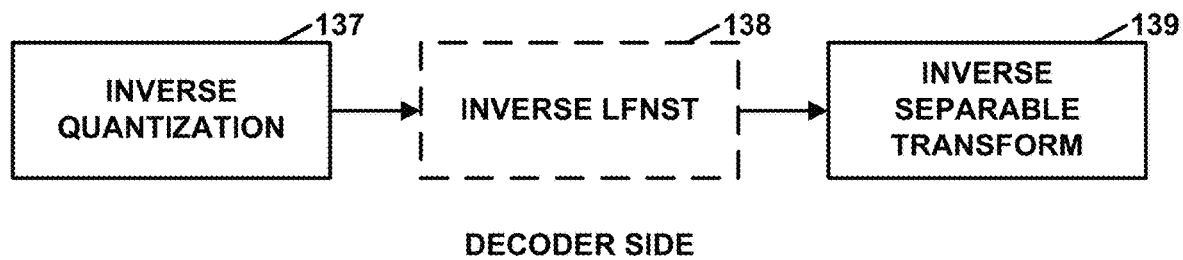
FIG. 3B is an illustration of an inverse LFNST at a video decoder.

Low-Frequency Non-Separable Transforms (LFNSTs), illustrated in FIG. 3A and FIG. 3B, are used in JEM-7.0 to further improve the coding efficiency of MTS, where an implementation of LFNST is based on Hypercube-Givens Transform (HyGT), which is described in U.S. Patent Publication No. 2017/0238013. See also U.S. Patent Publication Nos. 2017/0094313, 2017/0238014, U.S. patent application Ser. No. 16/364,007, and U.S. Provisional Patent Applications 62/668,105 and 62/849,689 (describing alternative designs and further details.

Particularly, FIG. 3A is an illustration of a LFNST at video encoder 200. In the example of FIG. 3A, video encoder 200 may first apply a separable transform 134 (e.g., a DCT or a DST) to a set of residual data for a current block to generate a first set of transform coefficients for the current block. The first set of transform coefficients for the current block may be MTS transform coefficients for current block. Video encoder 200 may then apply an LFNST 135 to the first set of transform coefficients to generate a second set of transform coefficients for the current block. After generating the second set of transform coefficients for the current block, video encoder 200 may quantize 136 transform coefficients in the second set of transform coefficients.

FIG. 3B is an illustration of an inverse LFNST at video decoder 300. In the example of FIG. 3B, video decoder 300 may first apply inverse quantization 137 to the second set of transform coefficients for the current block. Video decoder 300 may then apply an inverse LFNST 138 to the inverse quantized second set of transform coefficients for the current block to generate a first set of transform coefficients for the current block. Video decoder 300 may then apply an inverse transform 139 (e.g., an inverse DCT or an inverse DST) to the first set of transform coefficients for the current block to generate residual data for the current block.

LFNST has been adopted in the VVC standard. See e.g., Koo et al., "CE6: Reduced Secondary Transform (RST) (CE6-3.1)," Joint Video Experts Team (JVET) of ITU-T SG 16 WP 3 and ISO/IEC JTC 1/SC 29/WG 11, 14$^{th}$ Meeting, Geneva, CH, 19-27 Mar. 2019, document JVET-N0193. LFNST was previously called non-separable secondary transform (NSST) or secondary transform, where all these have the same meaning.

In the LFNST design of VVC Draft 5, a video encoder (e.g., video encoder 200) can perform a zero-out operation that keeps the K-lowest frequency transform coefficients transformed by an LFNST of size N (e.g., N=64 for 8×8 LFNST), and the video decoder (e.g., video decoder 300) reconstructs the separable transform coefficients (e.g., MTS transform coefficients) by only using those K transform coefficients. In VVC Draft 5, such a zero-out process is done using either a 4×4 non-separable LFNST (N=16) or an 8×8 non-separable LFNST (N=64) according to block size. For example, a 4×4 LFNST may be applied for blocks with smaller size (e.g., min (width, height)<8), whereas an 8×8 LFNST is applied for larger blocks. In this configuration, the video decoder implicitly infers (e.g., assumes) that the remaining N−K higher frequency transform coefficients are set to zero and K LFNST transform coefficients are used for reconstruction.

Figure 4:
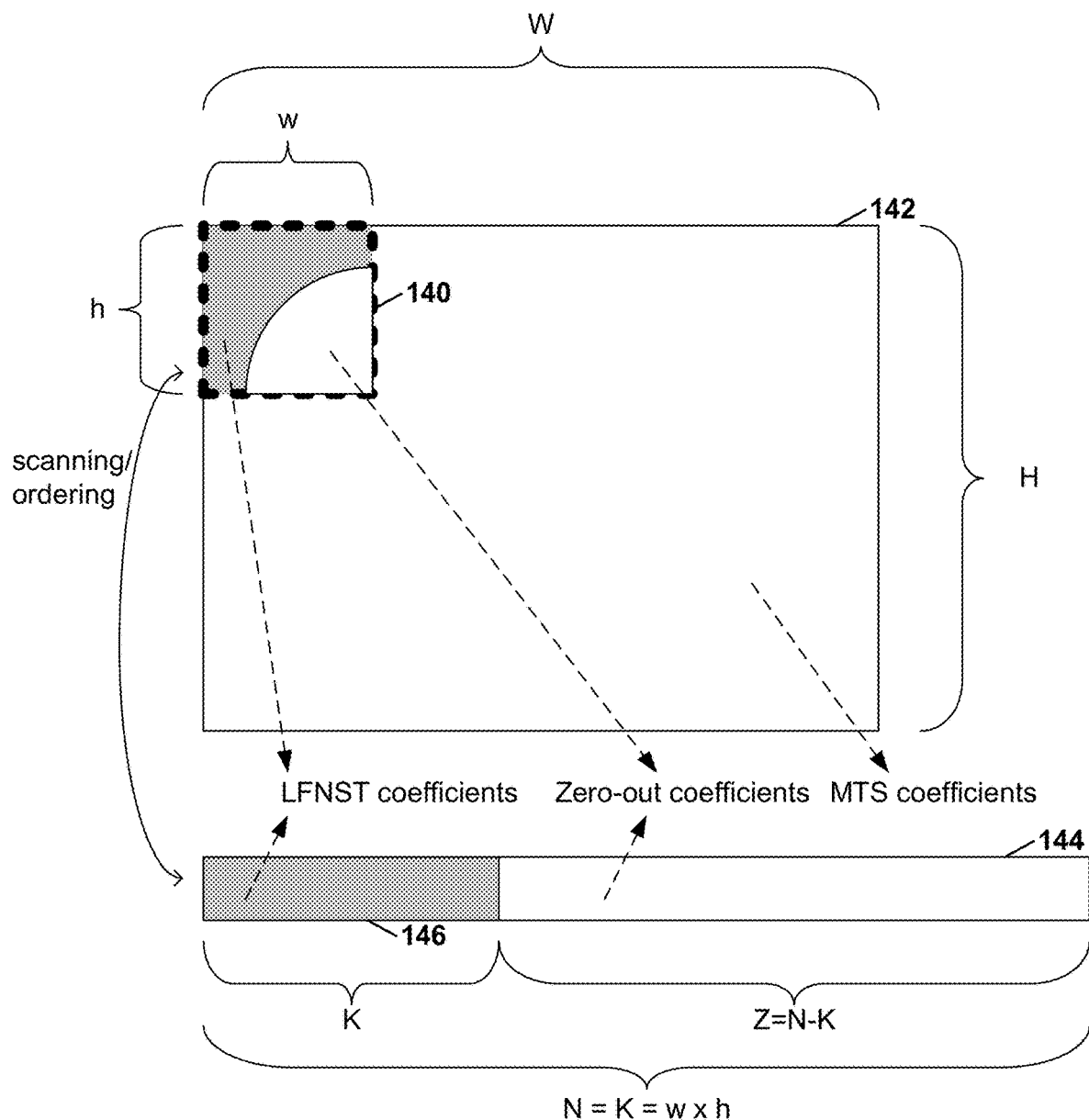
FIG. 4 is a conceptual diagram illustrating example transform coefficients obtained after applying an LFNST of size N to a h×w subblock with zero-out where Z transform coefficients out of N are zeroed-out, and K transform coefficients are retained.

FIG. 4 is a conceptual diagram illustrating example transform coefficients obtained after applying LFNST of size N to a h×w subblock 140 with zero-out where Z transform coefficients out of N are zeroed-out, and K transform coefficients are retained. The h×w subblock 140 shown in the example of FIG. 4 is a LFNST region of a block 142, which may be larger than h×w. FIG. 4 illustrates the transform coefficients obtained after applying an LFNST with zero-out on top of a subset of separable transform coefficients (e.g., MTS transform coefficients within the dashed-line h×w subblock 140). As discussed in U.S. Patent Publication No. 2017/0094313 and U.S. Provisional Patent Application 62/799,410, LFNST is performed by first converting 2-D h×w subblock 140 (including the darkly shaded area in FIG. 4) into a 1-dimensional list 144 (or vector) of transform coefficients via a pre-defined scanning order and then applying a transform on a subset 146 of the transform coefficients. The transform may be an arbitrary or pretrained transform.

Figure 5:
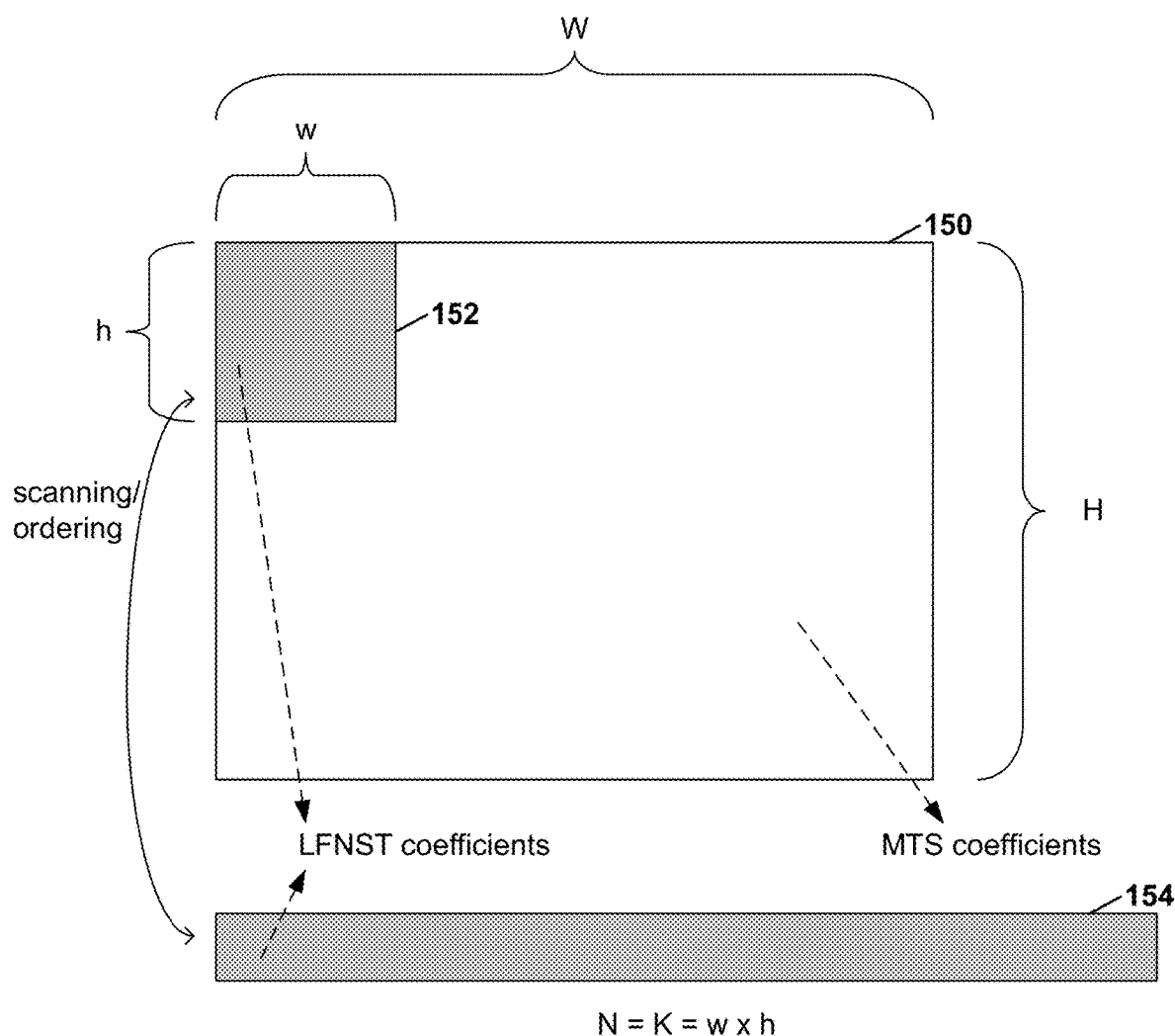
FIG. 5 is a conceptual illustration of LFNST transform coefficients obtained by applying LFNST without zero-out.

FIG. 5 is a conceptual illustration of LFNST transform coefficients obtained by applying an LFNST without zero-out. That is, FIG. 5 shows an example of a separable transform (e.g., MTS) and LFNST transform coefficients obtained without any zeroing-out. Specifically, in the example of FIG. 5, a block 150 has a size of H×W. An LFNST region 152 of block 150 has a size of h×w. In the example of FIG. 5, the LFNST transform coefficients in LFNST region 152 are scanned into a 1-dimensional vector 154 that includes w×h transform coefficients.

Figure 6:
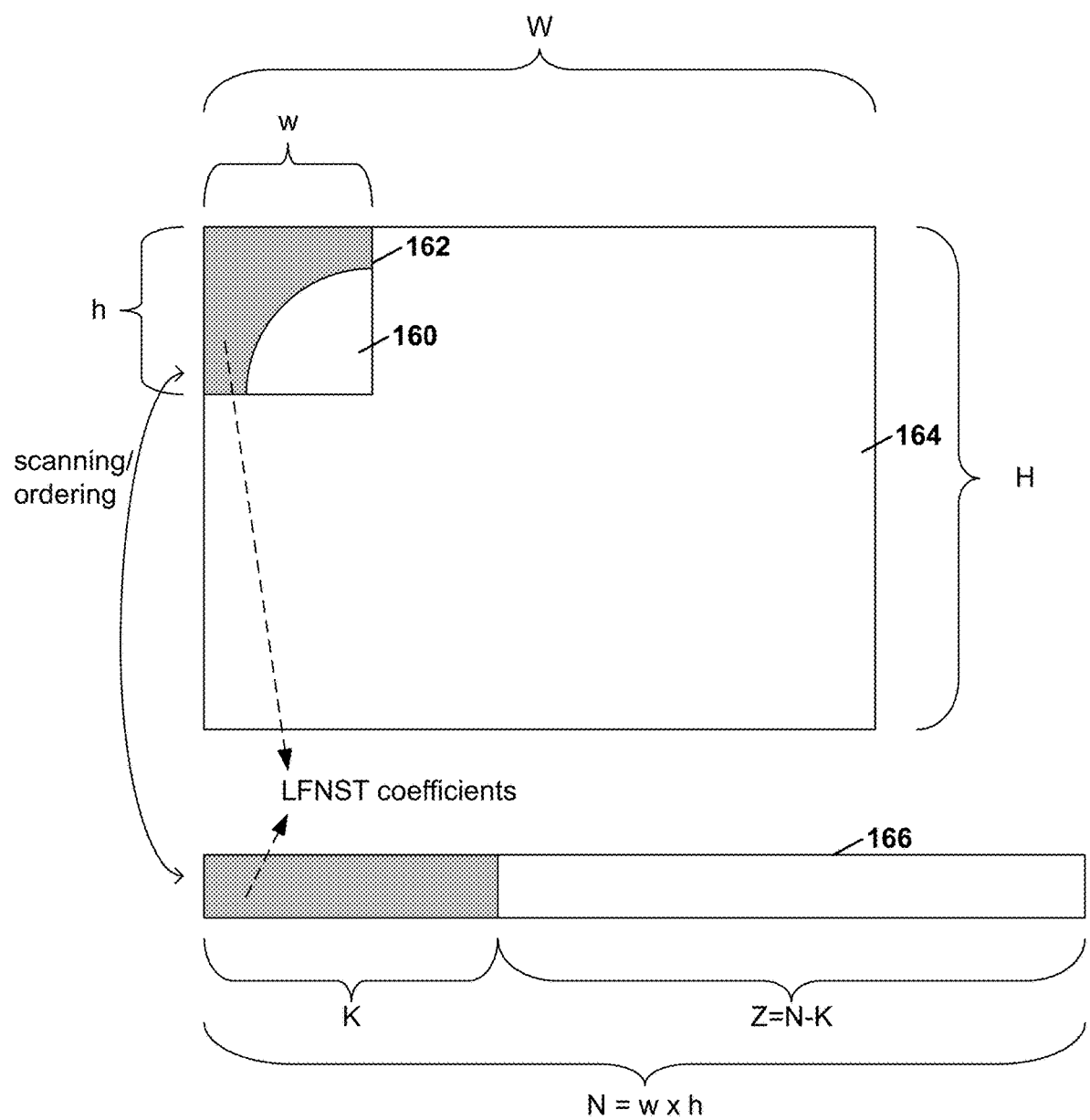
FIG. 6 is an illustration of LFNST transform coefficients obtained by applying LFNST and zeroing-out both the Z highest frequency transform coefficients in an LFNST region and Multiple Transform Selection (MTS) transform coefficients outside of the LFNST region.
Figure 7:
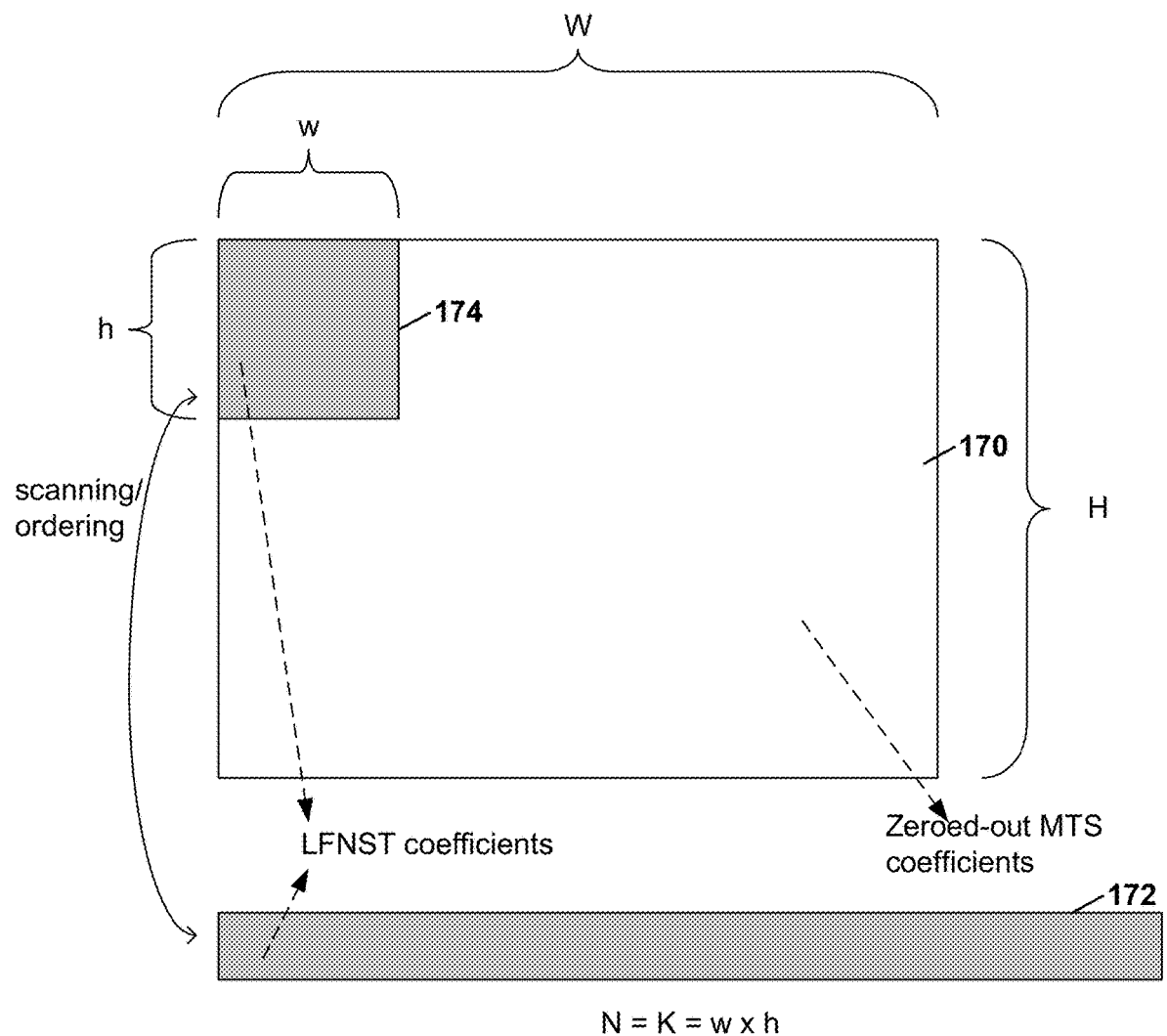
FIG. 7 is an illustration of LFNST transform coefficients by applying LFNST and only zeroing-out MTS transform coefficients outside of the LFNST region.

FIG. 6 and FIG. 7 illustrate variants of LFNST described in U.S. Provisional Patent Application 62/799,410 and U.S. patent application Ser. No. 15/931,271, which apply zero-out on transform coefficients outside of the LFNST region (e.g., MTS transform coefficients outside of shaded block). More specifically, FIG. 6 is an illustration of LFNST transform coefficients obtained by applying LFNST and zeroing-out both the Z highest frequency transform coefficients 160 in LFNST region 162 and the MTS transform coefficients 164 outside of LFNST region 162. Thus, in the example of FIG. 6, video encoder 200 may scan the LFNST transform coefficients (including the zero-out highest frequency transform coefficients 160) into a 1-dimensional vector 166. Hence, vector 166 includes N total LFNST transform coefficients, including K non-zeroed-out LFNST transform coefficients and Z zeroed-out transform coefficients.

FIG. 7 is an illustration of LFNST transform coefficients by applying LFNST and only zeroing-out MTS transform coefficients 170 outside of the LFNST region. FIG. 7 is similar to FIG. 6 except that the MTS coefficients are normatively zeroed-out. Thus, a vector 172 includes only w×h transform coefficients, where w is the width of LFNST region 174 and h is the height of LFNST region 174.

A goal of U.S. patent application Ser. No. 15/931,271 was to reduce the signaling overhead of an LFNST index/flag based on the side-information obtained from transform coefficient coding. The LFNST index (or LFNST flag) indicates whether LFNST is applied and, if LFNST is applied, which LFNST transform to apply. In VVC Draft 5, LFNST consists of 3 modes, which are signaled using LFNST index values 0, 1, and 2, where:

LFNST index 0 corresponds to skipping LFNST process (e.g., only MTS is used),

LFNST indices 1 and 2 are used to determine the non-separable transform from a set of two transforms chosen depending on a mode (e.g., an intra prediction mode) and a size of a block (i.e., CU/TU). The non-separable transform may also be referred to as a kernel.

For instance, as described in § 8.7.4.1 of VVC Draft 5, when an LFNST index is equal to 1 or 2, a video coder may determine a transform output size based on the size of a TU (e.g., nLfnstOutSize=(nTbW>=8 && nTbH>=8)? 48:16) and, as described in § 8.7.4.3 of VVC Draft 5, the video coder may determine an LFNST transform set index based on an intra prediction mode of a block (e.g., CU). Furthermore, as described in § 8.8.7.4.3 of VVC Draft 5, the video coder may select between two different tables specifying coefficients to apply when applying the LFNST.

In U.S. patent application Ser. No. 15/931,271, the zeroed-out transform coefficient patterns are used to infer LFNST indices. In other words, U.S. patent application Ser. No. 15/931,271 described techniques to avoid signaling of LFNST indices. In examples other than VVC Draft 5, there may be more or fewer than 3 modes.

This disclosure describes techniques that may reduce the signaling overhead of transform coefficient coding based on LFNST index/flag information. For example, an LFNST index/flag may be used as side information in transform coefficient coding. Reducing the signaling overhead of transform coefficient coding may lead to greater coding efficiency. The following signaling techniques of this disclosure may be used individually or in any combination.

In cases where LFNST applies a normative zero-out (i.e., when zero-out is applied both at video encoder 200 and video decoder 300) under a predefined set of conditions (e.g., block size, block shape and and/or transform-related syntax such as MTS index/flag)), both video encoder 200 and video decoder 300 use a block size and LFNST index/flag information to determine a pattern of normatively defined zero-transform coefficients. The term "LFNST index/flag" may be used to refer to an LFNST syntax element, such as an index or flag, that may be used to indicate, at least in part, what type of LFNST is applied. Based on the known or inferred zero-out pattern, the last transform coefficient position (i.e., the last significant transform coefficient position) can be restricted (or inferred to be bounded) so that:

i) the signaling of the last transform coefficient position is reduced based on the LFNST index/flag, ii) the number of coded/non-coded coefficient groups (CGs) can be inferred based on the LFNST index/flag, and iii) Encoder/decoder operations (and optimizations) that use the transform coefficient positions can be reduced or simplified based on the LFNST index/flag.

Signaling of the last transform coefficient position may be reduced because if LFNST is applied, the last transform coefficient position is guaranteed to be within the predefined LFNST zero-out region because all transform coefficients outside the zero-out region are forced to be 0. By moving signaling of the last transform coefficient position after LFNST, video decoder 300 may determine the zero out region before decoding the syntax elements that signal the last transform coefficient position. Thus, in accordance with one or more techniques of this disclosure, signaling of the last transform coefficient position may not be necessary (e.g., video decoder 300 may infer the last transform coefficient position to be the last element location in the predefined zero-out region) if LFNST is used.

As mentioned above, encoder and/or decoder operations (and optimizations) that use transform coefficient positions can be reduced or simplified based on the LFNST index/flag. Currently, video encoder 200 relies on estimating the last transform coefficient position to make decisions regarding entropy coding. Video decoder 300 also has to wait until the last transform coefficient position is decoded in order to perform further operations. However, in accordance with one or more techniques of this disclosure, by conditioning the last transform coefficient position based on LFNST zero-out, all those decisions are simpler because video encoder 200 and video decoder 300 does not need to wait for signaling of the last transform coefficient position.

For a predefined zero-out pattern, the last transform coefficient position/location (e.g., horizontal/vertical position X/Y) can be normatively restricted to or bounded by a position or location in a block (e.g., in a CU/TU/CG) where a transform coefficient can be non-zero (i.e., where a transform coefficient is not normatively zeroed-out). To provide specific examples from VVC Draft 5:

i) For 4×4 LFNST, a transform coefficient can be restricted (and inferred) to reside in the top-left 4×4 region of the block (a total of 16 transform coefficients)
.

ii) For 8×8 LFNST, a transform coefficient can be restricted (and inferred) to reside in the top-left 8×8 region of the block excluding the bottom 4×4 region (a total of 48 transform coefficients). Alternatively, in certain examples, a transform coefficient can be restricted to reside in the top-left 4×4 region of the block (a total of 16 transform coefficients).

iii) For 4×N or N×4 blocks with N>16, 4×4 LFNST is applied to two adjacent top-left 4×4 blocks each and the last transform coefficient position can be restricted (and inferred) accordingly.

If LFNST is applied (i.e., when the LFNST index/flag is non-zero), the zero-out pattern can be determined based on block size information. For example, LFNST has several edge cases. For instance, if a block size is 8×8, at most 8 transform coefficients are kept in a pre-defined zero-out region that includes 48 transform coefficients out of a total of 64 coefficients. By knowing that the block size is 8×8, video encoder 200 and video decoder 300 may determine the zero-out pattern (e.g., by use of a predefined mapping from block sizes to zero-out patterns).

In the variants of LFNST that apply zero-out to all transform coefficients outside of the LFNST region as shown in FIG. 6 and FIG. 7 and described in U.S. Provisional Patent Application 62/799,410 and U.S. patent application Ser. No. 15/931,271, the last transform coefficient position can be restricted to a predetermined location where the transform coefficients beyond the predetermined location are known to be normatively zeroed-out. If LFNST is applied, then the last transform coefficient position is guaranteed to be within the predefined LFNST zero-out region. This is because all transform coefficients outside the zero-out region are forced to be 0. In this case, even though the actual last transform coefficient position can be outside the zero-out region, it may be useless to signal information specifying the last transform coefficient position because the transform coefficient at the last transform coefficient position will be zeroed out later in processing. Restricting the last transform coefficient position to a predetermined location where the transform the transform coefficients beyond the predetermined location are known to be normatively zeroed-out means that if LFNST is used and the last position is outside the zero-out region, syntax elements specifying the last transform coefficient position are not signaled, rather the last transform coefficient position may be inferred to be the last element of the predefined zero-out region.

Because the last transform coefficient is restricted to the predetermined location, it may not be necessary to signal the last transform coefficient position. Additionally, because the last transform coefficient is restricted to the predetermined location, any CGs occurring after the predetermined location may be inferred to be non-coded CGs. Thus, it may not be necessary to signal whether CGs occurring after the predetermined location are coded CGs.

In accordance with some techniques of this disclosure, signaling of LFNST indices/flags may be unified with MTS signaling. In VVC Draft 5, LFNST signaling is performed at a CU level. For instance, in VVC Draft 5, LFNST indices/flags (e.g., lfnst_idx) are included in coding_unit syntax structures. The present disclosure proposes signaling a LFNST index/flag before transform coefficient coding. Because the LFNST index/flag is signaled before transform coefficient coding, the signaling of LFNST index/flag can be done at a TU level. In other words, LFNST indices/flags may be signaled in transform_unit syntax structures. In other examples, LFNST indices/flags may be signaled at a CU level. In other words, LFNST indices/flags may be signaled in coding_unit syntax structures.

Because some of the techniques of this disclosure allow video encoder 200 to signal LFNST information before transform coefficient coding, in an alternative design the signaling of a LFNST index/flag may be combined with existing transform signaling (e.g., MTS signaling done before transform coefficient coding in VVC Draft 5). Thus, the MTS signaling and LFNST signaling can be unified/harmonized. Examples of such unifications/harmonizations are discussed in U.S. patent application Ser. No. 16/426,749 and U.S. Provisional Patent Application 62/830,125. For instance, LFNST is signaled separately from a primary transform (MTS). This is because LFNST is signaled at a CU level and MTS is signaled at TU level. It is possible to bundle MTS and LFNST together such that LFNST is another mode of MTS.

This disclosure also describes techniques for signaling LFNST indices/flags for partitioned blocks, such as partitioned CUs. For instance, in some examples, if a block (e.g., CU) is split into multiple subblocks (e.g., TUs), an LFNST index may be signaled for each subblock (e.g., TU) separately. For instance, there may be a separate LFNST index for each TU of the CU.

In other examples, an LFNST index may be signaled for a subset of subblocks (e.g., TUs). For instance, in one example, an LFNST index can be signaled only for subblocks (e.g., TUs) with coded block flags (CBFs) enabled (i.e., when CBF flags are true).

In some examples, an LFNST flag/index can be signaled (e.g., by video encoder 200) based on threshold-based criteria or count-based criteria using TU level parameters on separate TUs. For instance, in some examples where video encoder 200 signals the LFNST flag/index based on a threshold-based criteria using TU level parameters on separate TUs, the threshold can be fixed to a constant value (e.g. 2), and an LFNST index/flag can be signaled (e.g., by video decoder 300) for luma and/or chroma if the last transform coefficient position is less than this threshold.

In some examples where video encoder 200 signals an LFNST flag/index based on threshold-based criteria using TU level parameters on separate TUs, the threshold can be applied on the luma-based last position value for the dual-tree-disabled case in VVC Draft 5 (i.e., the single tree case). In the single tree case, a CU is divided into TUs in the same way for both the luma and chroma components. In a dual tree case, a CU may be divided into TUs in different ways for the luma and chroma components.

Furthermore, in some examples where video encoder 200 signals an LFNST flag/index based on threshold-based criteria using TU level parameters on separate TUs, a threshold used for signaling an LFNST index/flag can be based on the last position of significant transform coefficients (i.e., the last significant transform coefficient position). For example, if the last transform coefficient position is equal to the DC term or less (meaning no transform coefficients), LFNST should not be applied for individual TUs.

In some examples, video encoder 200 signals LFNST indices/flags using counter-based criteria as in VVC Draft 5. For instance, in VVC Draft 5, if a CU is coded using a single tree, a video encoder signals an lfnst_idx syntax element (e.g., an LFNST index or LFNST flag) for a CU if the number of significant coefficients (numSigCoeff) in the CU is greater than 2 and the number of zero out significant coefficients in the CU is equal to 0. In VVC Draft 5, if a CU is coded using a dual tree, a video encoder signals an lfnst_idx syntax element if the number of significant coefficients in the CU (numSigCoeff) is greater than 1 and the number of zero out significant coefficients in the CU is equal to 0. In accordance with an example of this disclosure that uses counter-based criteria for determining whether to signal an LFNST index/flag for a TU, video encoder 200 may signal, for each TU of a CU coded using a signal tree, an lfnst_idx syntax element for the TU if the number of significant coefficients in the TU is greater than 2 and the number of zero out significant coefficients in the TU is equal to 0. In this example, if the CU is coded using a dual tree, a video encoder signals an lfnst_idx syntax element if the number of significant coefficients in the TU (numSigCoeff) is greater than 1 and the number of zero out significant coefficients in the TU is equal to 0.

In some examples, video encoder 200 signals LFNST indices/flags based on the relative location of a current TU with respect to the first TU in a given CU (e.g. TU index). For instance, video encoder 200 may signal an LFNST index/flag for a TU below and/or right of the first TU, but not below and right of the first TU.

In some examples, video encoder 200 may determine whether to signal an LFNST index/flag based on whether a CU is dual tree or single tree coded. For instance, in some examples, video encoder 200 may signal LFNST indices/flags for TUs of a CU when the CU is dual tree coded and not single tree coded. In other examples, video encoder 200 may signal LFNST indices/flags for TUs of a CU when the CU is single tree coded and not dual tree coded.

Furthermore, in some examples, video encoder 200 may determine whether to signal an LFNST index/flag based on a value of a DC component (e.g. value of the transform coefficient on the top-left corner of a TU or a CU). For instance, video encoder 200 may signal an LFNST index for a TU or CU based on the DC component of the TU or CU being above (or, alternatively, below) a specific threshold.

In some examples, video encoder 200 may determine whether to signal an LFNST index/flag based on a magnitude, standard deviation, and/or statistics of transform coefficients in a TU or a CU. For example, video encoder 200 may signal an LFNST index/flag when a total (or maximum) magnitude or standard deviation of the transform coefficients in a TU or a CU are above (or, alternatively, below) a specific threshold.

In some examples where video encoder 200 signals LFNST indices/flags for partitioned blocks, video encoder 200 may signal an LFNST index/flag for a single subblock (a single TU). For instance, in one example, video encoder 200 may signal an LFNST index only for a first subblock (e.g., the first-occurring TU in a CU). In this example, video encoder 200 and video decoder 300 may infer that the remaining subblocks (e.g., TUs) of the CU use the same LFNST index/flag as the first subblock (e.g., TU). Alternatively, in this example, video encoder 200 and video decoder 300 may infer LFNST indices/flags for the remaining TUs based on a predefined value. For example, the LFNST index/flag may be disabled (i.e., may be set to zero). In other words, video encoder 200 and video decoder 300 may infer LFNST indices/flags for the remaining TUs have a predefined value that indicates that LFNST is disabled.

In some examples where video encoder 200 signals an LFNST index/flag for only a single subblock (e.g., TU) of a CU, video encoder 200 may signal an LFNST index only for the first subblock whose CBF flag is enabled. In other words, in this example, video encoder 200 may signal an LFNST index only for the first-occurring sub-block that has a CBF that indicates that the sub-block includes a significant transform coefficient.

In some examples where video encoder 200 signals an LFNST index/flag for only a single subblock (e.g., TU) of a CU, if a coefficient threshold is used to derive the LFNST index/flag, video encoder 200 and video decoder 300 may count the number of nonzero transform coefficients only within the first subblock (first TU) and video encoder 200 and video decoder 300 may compare the count against a coefficient threshold to infer a value of the LFNST index/flag for the subblock. Thus, in such examples, video encoder 200 and video decoder 300 may derive the LFNST index/flag using the first subblock (the first TU) only.

Furthermore, in some examples, video encoder 200 only signals an LFNST flag/index for a single TU or a first TU, based on threshold-based criteria or count-based criteria that are based on TU level parameters. For instance, in some examples where video encoder 200 only signals an LFNST flag/index for a single TU or a first TU based on threshold-based criteria that are based on TU level parameters, the threshold can be fixed to a constant value (e.g. 2), and video encoder 200 may signal an LFNST index/flag for luma and/or chroma if a last transform coefficient position is less than the threshold.

In some examples where video encoder 200 only signals an LFNST flag/index for a single TU or a first TU based on threshold-based criteria that are based on TU level parameters, the threshold can be applied on the luma-based last position value for a dual tree disabled case in VVC Draft 5 (i.e., in a single tree case).

Furthermore, in some examples where video encoder 200 only signals an LFNST flag/index for a single TU or a first TU based on threshold-based criteria that are based on TU level parameters, a threshold used for signaling LFNST can be:

a. Based on the last position of significant transform coefficients (i.e., the last significant transform coefficient position), b. Counter-based as in VVC Draft 5, c. Based on the relative location of current TU with respect to the first TU in a given CU (e.g. TU index), d. Based on whether the CU is dual tree or single tree coded, e. Based on the value of the DC component (e.g. value of the transform coefficient on the top-left corner of a TU or a CU), f. Based on the magnitude, standard deviation, and statistics of the transform coefficients in a TU or a CU.

As an example, in VVC Draft 5, a CU can be partitioned into four TUs when the CU size is 128×128. Thus, the signaling method above can be used for such CUs/TUs in VVC.

In this way, video encoder 200 may, in some examples, determine that a current block of the video data is split into a plurality of subblocks. In this example, the plurality of subblocks include a current subblock of the current block. Video encoder 200 may also generate residual data for the current block of the video data. The residual data for the current block includes residual data for the current subblock. Video encoder 200 may then apply a transform (e.g., an MTS transform) to the residual data for the current subblock to generate first transform coefficients for the current subblock. Additionally, video encoder 200 may determine, based on threshold- or counter-based criteria, that an LFNST syntax element (e.g., an LFNST index/flag) for the current subblock is to be signaled in a bitstream. The bitstream includes an encoded representation of the video data. The LFNST syntax element may indicate whether an LFNST is applied for the current block. Based on the determination that the LFNST syntax element is to be signaled in the bitstream, video encoder 200 may signal the LFNST index in the bitstream at a subblock (e.g., TU) level. Furthermore, video encoder 200 may apply the LFNST to the first transform coefficients of the current subblock to determine values of one or more second transform coefficients in an LFNST region of the current subblock.

In some examples, video decoder 300 may determine that a current block of the video data is split into a plurality of subblocks. In this example, the plurality of subblocks includes a current subblock of the current block. Furthermore, video decoder 300 may determine, based on threshold-based criteria or count-based criteria, that a LFNST syntax element for the current block is signaled in a bitstream. The bitstream includes an encoded representation of the video data. Based on a determination that the LFNST syntax element is signaled in the bitstream, video decoder 300 may obtain the LFNST syntax element from the bitstream. Based on the LFNST syntax element indicating that an LFNST is applied for the current subblock, video decoder 300 may apply an inverse of the LFNST to determine values of one or more transform coefficients in an LFNST region of the current block. In some examples, video decoder 300 may determine that transform coefficients of the current block in a region of the current subblock defined by a zero-out pattern are equal to 0. Furthermore, video decoder 300 may apply an inverse transform to the transform coefficients of the current subblock to determine residual data for the current subblock. Video decoder 300 may reconstruct the current block based on the residual data for the current subblock (e.g., along with residual data for other subblocks of the current block).

Figure 8:
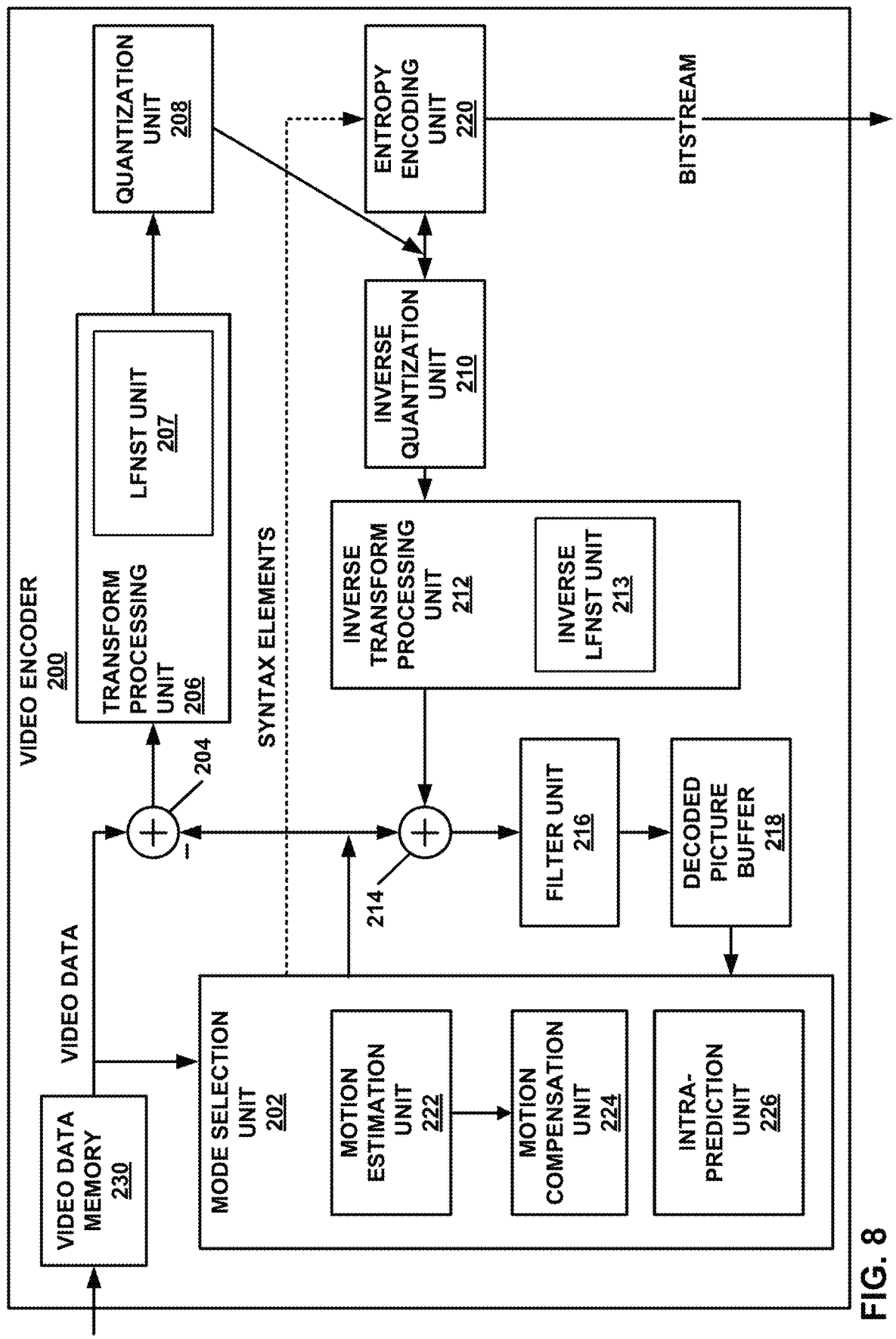
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions. For instance, in the example of FIG. 8, transform processing unit 206 includes an LFNST unit 207 and inverse transform processing unit 212 includes an inverse LFNST unit 213.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In accordance with one or more techniques of this disclosure, transform processing unit 206 may apply a transform (e.g., DCT, discrete sine transform (DST), etc.) to residual data to generate first transform coefficients for a current block, such as a CU or a subblock (e.g., TU). Additionally, LFNST unit 207 may determine a zero-out pattern of normatively defined zero-out transform coefficients. LFNST unit 207 may also determine second transform coefficients of the current block. In this example, the current block includes a LFNST region. As part of LFNST unit 207 determining the second transform coefficients, LFNST unit 207 may apply an LFNST to determine values of one or more second transform coefficients in the LFNST region. Additionally, LFNST unit 207 may determine that the second transform coefficients of the current block in a region of the block defined by the zero-out pattern are equal to 0. LFNST unit 207 may also determine a LFNST syntax element (e.g., an LFNST index/flag). The LFNST syntax element in combination with a mode of the current block and a size of the current block specifies the LFNST. Video encoder 200 may signal the LFNST syntax element at a TU level.

In accordance with one or more techniques of this disclosure, video encoder 200 may determine that a current block of the video data is split into a plurality of subblocks, where the plurality of subblocks includes a current subblock of the current block. Residual generation unit 204 may generate residual data for the current block of the video data. The residual data for the current block includes residual data for the current subblock. Furthermore, transform processing unit 206 may apply a transform to the residual data to generate first transform coefficients for the current subblock. LFNST unit 207 may determine, based on threshold-based criteria or count-based criteria, that a LFNST syntax element for the current subblock is to be signaled in a bitstream. In this example, the bitstream comprises an encoded representation of the video data and the LFNST syntax element indicates whether an LFNST is applied for the current subblock. Based on the determination that the LFNST syntax element is to be signaled in the bitstream, video encoder 200 may signal the LFNST syntax element in the bitstream at a subblock (e.g., TU level). LFNST unit 207 may apply the LFNST to the first transform coefficients for the current subblock to determine values of one or more second transform coefficients in an LFNST region of the current subblock.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block.

As noted above, inverse transform processing unit 212 may include an inverse LFNST unit 213. Inverse LFNST unit 213 may apply an inverse of an LFNST applied by LFNST unit 207. In accordance with one or more techniques of this disclosure, inverse LFNST unit 213 may determine, based on a block size of a current block (e.g., CU, subblock, etc.), a mode of the current block, and a LFNST syntax element, a zero-out pattern of normatively defined zero-coefficients. The LFNST syntax element may be signaled at a transform unit (TU) level. Additionally, inverse LFNST unit 213 may determine transform coefficients of the current block. The transform coefficients of the current block include transform coefficients in an LFNST region of the current block and transform coefficients outside the LFNST region of the current block. As part of determining the transform coefficients of the current block, inverse LFNST unit 213 may apply an inverse LFNST to determine values of one or more transform coefficients in the LFNST region of the current block. Additionally, as part of determining the transform coefficients of the current block, inverse LFNST unit 213 may determine that transform coefficients of the current block in a region of the current block defined by the zero-out pattern are equal to 0. Inverse transform processing unit 212 may apply an inverse transform (e.g., an inverse DCT, inverse DST, etc.) to the transform coefficients of the current block to determine residual data for the current block.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to generate residual data for a current block of the video data. The one or more processing units of video encoder 200 may also apply a transform to the residual data to generate first transform coefficients for the current block. Furthermore, the one or more processing units of video encoder 200 may determine a zero-out pattern of normatively defined zero-out transform coefficients. The one or more processing units of video encoder 200 may also be configured to determine second transform coefficients of the current block. The current block includes a LFNST region. The one or more processing units of video encoder 200 may be configured such that, as part of determining the second transform coefficients of the current block, the one or more processing units of video encoder 200 may apply a LFNST to determine values of one or more second transform coefficients in the LFNST region of the current block. Additionally, as part of determining the second transform coefficients of the current block, the one or more processing units of video encoder 200 may determine that the second transform coefficients of the current block in a region of the block defined by the zero-out pattern are equal to 0. The one or more processing units of video encoder 200 may also determine a LFNST syntax element, wherein the LFNST syntax element in combination with a mode of the current block and a size of the current block specifies the LFNST. The one or more processing units of video encoder 200 may signal the LFNST syntax element at a subblock level, e.g., a TU level.

In some examples, video encoder 200 represents an example of a device configured to encode video data including a memory configured to store video data, and one or more processing units implemented in circuitry and configured to generate residual data for a current block of the video data. The one or more processing units of video encoder 200 may also apply a transform to the residual data to generate first coefficients for the current block. Furthermore, the one or more processing units of video encoder 200 may determine a LFNST syntax element. The one or more processing units of video encoder 200 may also determine, based on a block size of the current block and the LFNST syntax element, a zero-out pattern of normatively defined zero-coefficients. The one or more processing units of video encoder 200 may determine second coefficients of the current block, wherein the current block includes an LFNST region, and determining the second coefficients of the current block comprises: applying a LFNST to determine values of one or more second coefficients in the LFNST region of the current block; and determining that second coefficients of the current block in a region of the block defined by the zero-out pattern are equal to 0.

Figure 9:
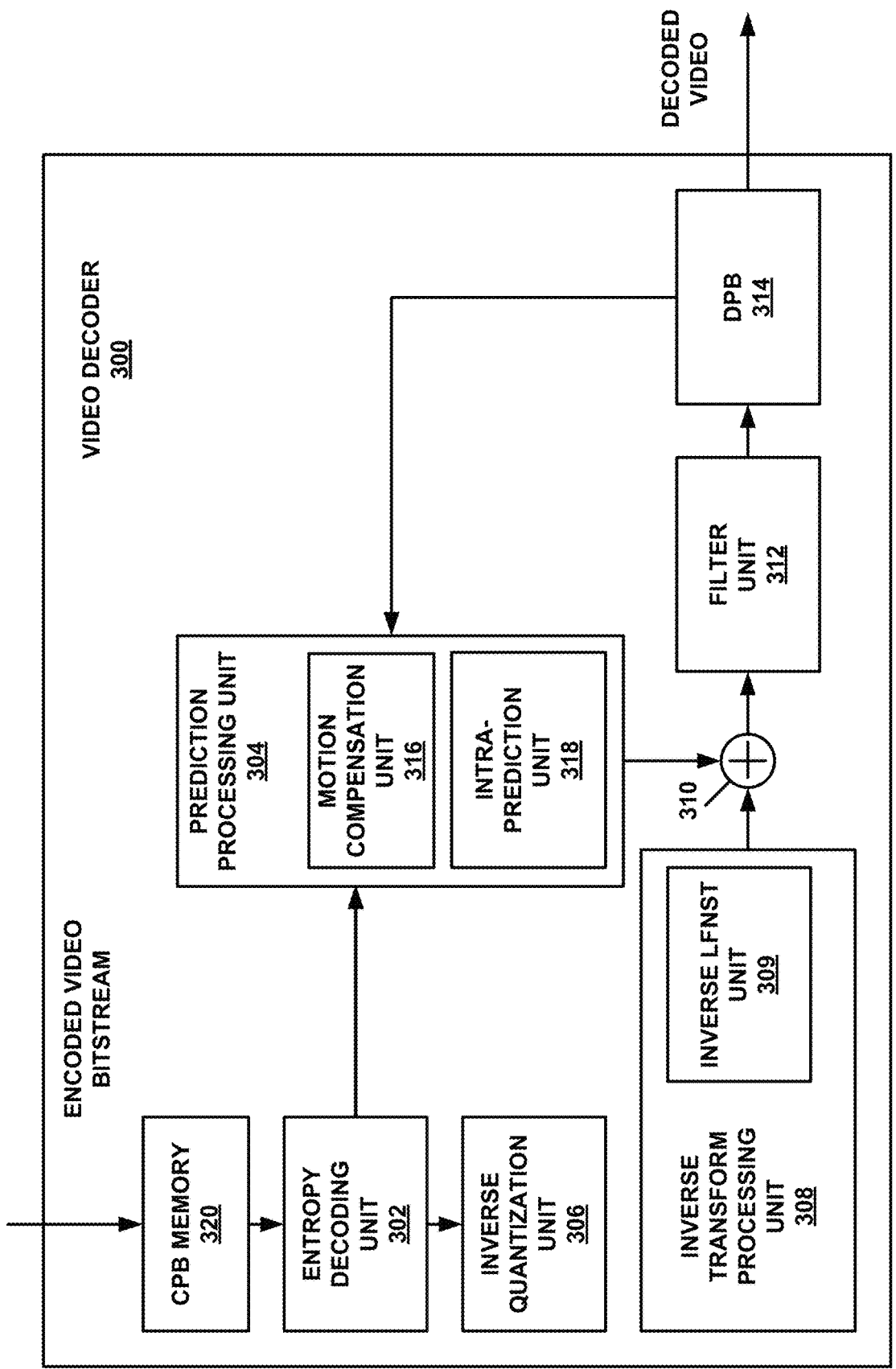
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. In the example of FIG. 9, inverse transform processing unit 308 includes an inverse LFNST unit 309. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

In the example of FIG. 9, inverse transform processing unit 308 includes inverse LFNST unit 309. Inverse LFNST unit 309 is configured to apply an inverse LFNST. For instance, inverse LFNST unit 309 may determine, based on a block size of a current block and a LFNST syntax element, a zero-out pattern of normatively defined zero-coefficients. The current block may be a CU, TU, subblock, or other type of block. In this example, the LFNST syntax element may be signaled at a TU level. In other examples, the LFNST syntax element may be signaled at a CU level or another level. Furthermore, inverse LFNST unit 309 may determine transform coefficients of the current block. The transform coefficients of the current block include transform coefficients in an LFNST region of the current block and transform coefficients outside the LFNST region of the current block. As part of determining the transform coefficients of the current block, inverse LFNST unit 309 may apply an inverse LFNST to determine values of one or more transform coefficients in the LFNST region of the current block. Additionally, as part of determining the transform coefficients of the current block. Inverse LFNST unit 309 may determine that transform coefficients of the current block in a region of the current block defined by the zero-out pattern are equal to 0. Inverse transform processing unit 308 may apply an inverse transform (e.g., an inverse DCT, inverse DST, etc.) to the transform coefficients of the current block to determine residual data for the current block.

In some examples of this disclosure, entropy decoding unit 302 (or another unit of video decoder 300) may determine, based on threshold-based criteria or count-based criteria, that a LFNST syntax element for a subblock (e.g., TU or other type of subblock) of the current block is signaled in a bitstream. Based on a determination that the LFNST syntax element is signaled in the bitstream, entropy decoding unit 302 (or another unit of video decoder 300) may obtain the LFNST syntax element from the bitstream. Based on the LFNST syntax element indicating that an LFNST is applied for the current subblock, inverse LFNST unit 309 may apply an inverse of the LFNST to determine values of one or more transform coefficients in an LFNST region of the subblock of the current block. Inverse transform processing unit 308 may apply an inverse transform (e.g., an inverse DCT, an inverse DST, or other type of transform) to the transform coefficients of the subblock of the current block to determine residual data for the subblock of the current block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314.

As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine, based on a block size of a current block and a LFNST syntax element, a zero-out pattern of normatively defined zero-coefficients. In some examples, the LFNST syntax element is signaled at a TU level. Video decoder 300 may determine transform coefficients of the current block. The transform coefficients of the current block include transform coefficients in an LFNST region of the current block and transform coefficients outside the LFNST region of the current block. In this example, as part of determining the transform coefficients of the current block, video decoder 300 may apply an inverse LFNST to determine values of one or more transform coefficients in the LFNST region of the current block. Additionally, video decoder 300 may determine that transform coefficients of the current block in a region of the current block defined by the zero-out pattern are equal to 0. Video decoder 300 may apply an inverse transform to the transform coefficients of the current block to determine residual data for the current block. Video decoder 300 may reconstruct the current block based on the residual data for the current block.

Furthermore, in some examples, video decoder 300 represents an example of a video decoding device including a memory configured to store video data, and one or more processing units implemented in circuitry and configured to determine that a current block of the video data is split into a plurality of subblocks, the plurality of subblocks including a current subblock of the current block. The one or more processors may further determine, based on threshold-based criteria or count-based criteria, that a LFNST syntax element for a subblock of the current block is signaled in a bitstream. Furthermore, the one or more processors may be configured such that, based on a determination that the LFNST syntax element is signaled in the bitstream, the one or more processors obtain the LFNST syntax element from the bitstream. Based on the LFNST syntax element indicating that an LFNST is applied for the current subblock, the one or more processors may apply an inverse of the LFNST to determine values of one or more transform coefficients in an LFNST region of the subblock of the current block. The one or more processors may apply an inverse transform to the transform coefficients of the subblock of the current block to determine residual data for the subblock of the current block. The one or more processors may reconstruct the current block based on the residual data for the subblock of the current block.

Figure 10:
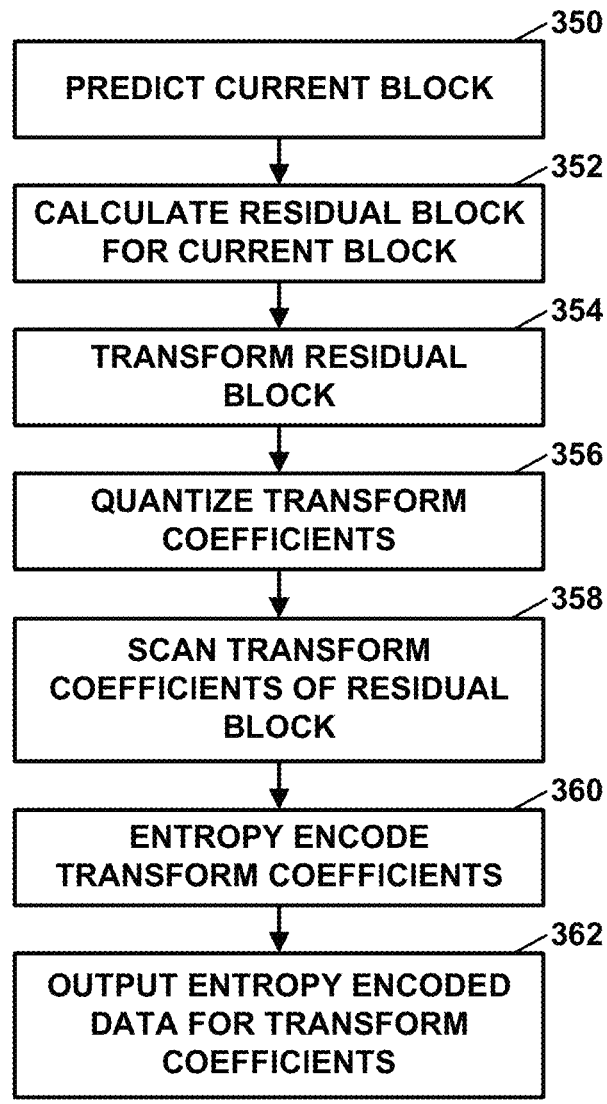
FIG. 10 is a flowchart illustrating an example method for encoding a current block.

FIG. 10 is a flowchart illustrating an example method for encoding a current block. The current block may comprise a current CU. Although described with respect to video encoder 200 (FIGS. 1 and 8), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual data to generate transform coefficients (354). As part of transforming the residual data, video encoder 200 may determine and apply an LFNST as described in any of the examples of this disclosure.

Video encoder 200 may quantize the transform coefficients of the residual block (356). Next, video encoder 200 may scan the quantized transform coefficients of the residual block (358). During the scan, or following the scan, video encoder 200 may entropy encode the transform coefficients (360). For example, video encoder 200 may encode the transform coefficients using CAVLC or CABAC. Video encoder 200 may then output the entropy encoded data of the block (362).

Figure 11:
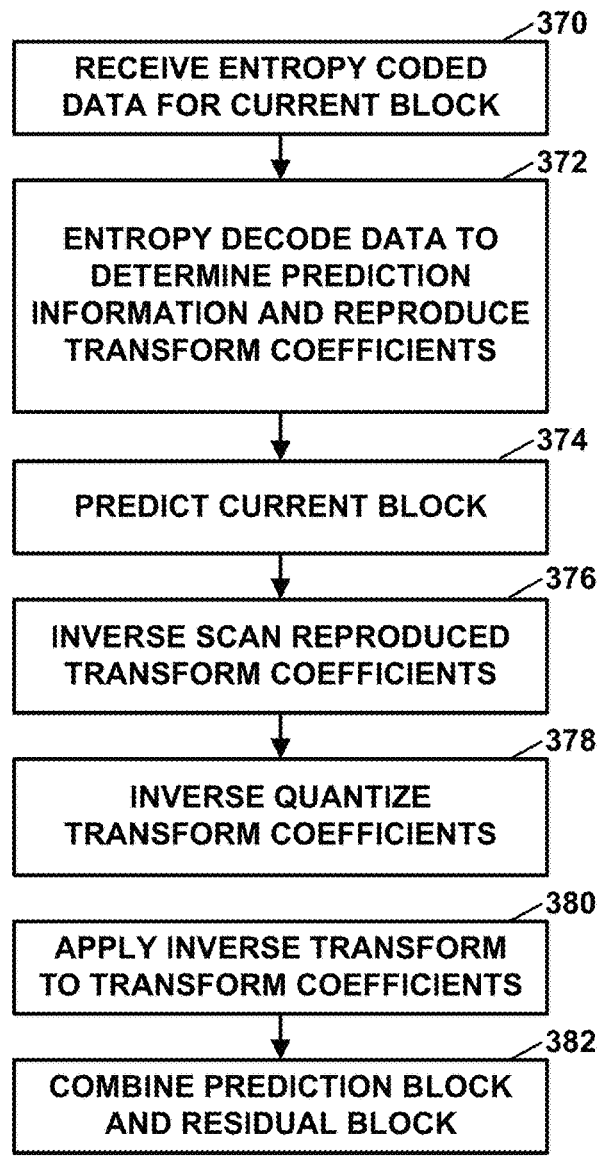
FIG. 11 is a flowchart illustrating an example method for decoding a current block of video data.

FIG. 11 is a flowchart illustrating an example method for decoding a current block of video data. The current block may comprise a current CU. Although described with respect to video decoder 300 (FIGS. 1 and 9), it should be understood that other devices may be configured to perform a method similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients to create a block of quantized transform coefficients (376). Video decoder 300 may then inverse quantize the transform coefficients (378). Additionally, video decoder 300 may apply an inverse transform to the transform coefficients to produce a residual block (380). In some examples, video decoder 300 may apply an inverse LFNST as part of producing the residual block as described in any of the examples of this disclosure. Video decoder 300 may ultimately decode the current block by combining the prediction block and the residual block (382).

Figure 12:
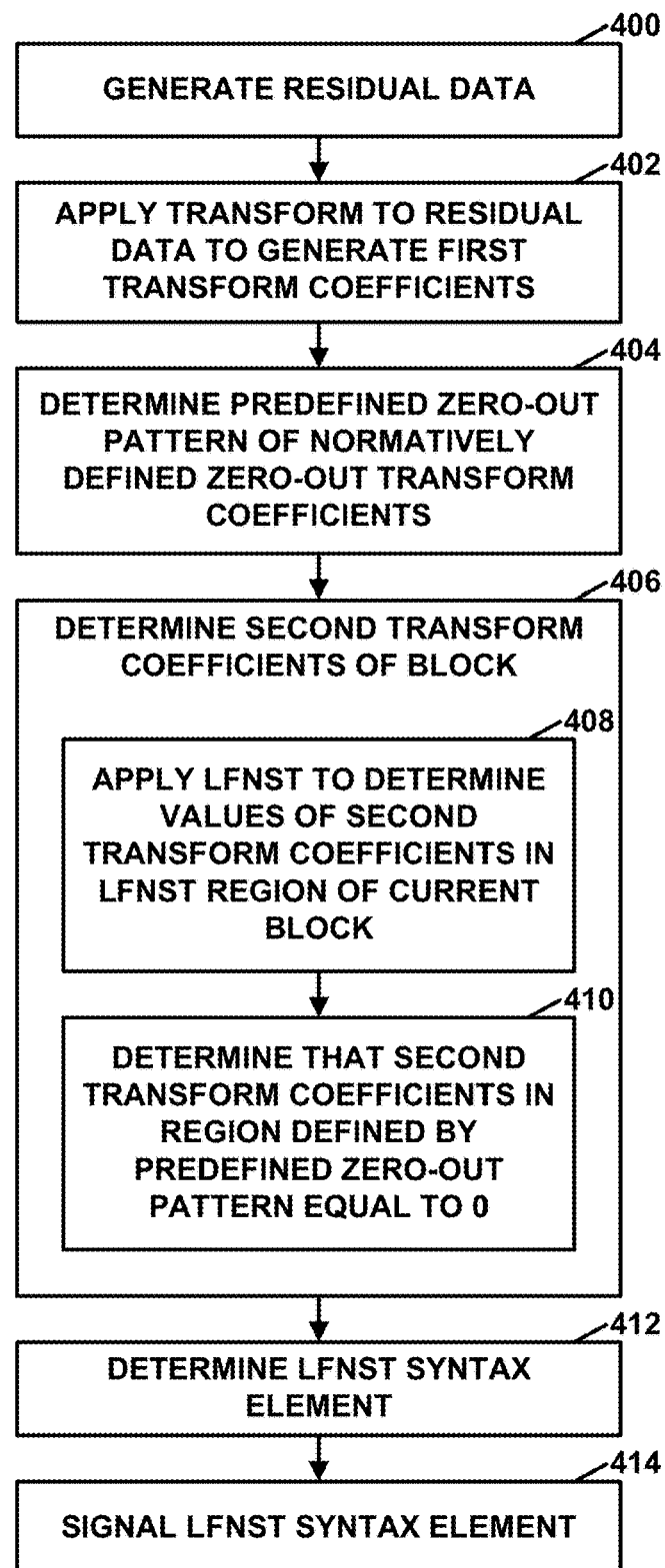
FIG. 12 is a flowchart illustrating an example method for encoding video data in accordance with one or more techniques of this disclosure.

FIG. 12 is a flowchart illustrating an example method for encoding video data in accordance with one or more techniques of this disclosure. In the example of FIG. 12, video encoder 200 (e.g., residual generation unit 204 of video encoder 200) may generate residual data for a current block of the video data (400). For instance, video encoder 200 may subtract samples of a prediction block for the current block from corresponding samples of the current block to generate the residual data for the current block.

Furthermore, video encoder 200 (e.g., transform processing unit 206 of video encoder 200) may apply a transform to the residual data to generate first transform coefficients for the current block (402). For example, video encoder 200 may apply an MTS transform, a DCT, a DST, or other type of transform to the residual data.

Video encoder 200 (e.g., LFNST unit 207 of video encoder 200) may determine a zero-out pattern of normatively defined zero-out transform coefficients (404). For instance, to determine the zero-out pattern, video encoder 200 may test LFNSTs associated with different zero-out patterns and select the LFNST based on results of the test, such as rate-distortion metrics.

In some examples, video encoder 200 determines a number of coded coefficient groups and non-coded coefficient groups (CGs) based on the LFNST syntax element. For instance, to determine the number of coded and non-coded CGs based on the LFNST syntax element, video encoder 200 may determine that the number of coded CGs includes any CG occurring in CG scanning order before a CG that falls entirely within the zero-out pattern. Thus, when determining the transform coefficients of the current block, video encoder 200 may determine, based on the number of CGs, whether to signal, in the bitstream, syntax elements indicating values of transform coefficients for any CGs beyond the number of coded CGs. Furthermore, in some examples, it may be unnecessary to signal CBFs for CGs that are beyond the number of coded CGs. Avoiding the need to signal CBGs for CGs that are beyond the number of coded CGs may increase coding efficiency.

Furthermore, in some examples, a last significant coefficient position of the current block is normatively restricted to a position in the current block allowed to be non-zero by the zero-out pattern. In other words, video encoder 200 may determine that the last significant coefficient position of the current block must not be in the area of the current block that is zeroed-out in the zero-out pattern. In some examples, video decoder 300 may therefore infer that any transform coefficient of the current block that is not normatively zeroed-out may be a significant coefficient. Thus, it may be unnecessary for video encoder 200 to signal syntax elements to indicate the position of the last significant transform coefficient of the current block. Avoiding the need to signal the syntax elements to indicate the position of the last significant transform coefficient of the current block may increase coding efficiency.

Additionally, in the example of FIG. 12, video encoder 200 (e.g., LFNST unit 207) may determine second transform coefficients of the current block (406). The current block includes a LFNST region. As part of determining the second transform coefficients of the current block, video encoder 200 (e.g., LFNST unit 207) may apply a LFNST to determine values of one or more second transform coefficients in the LFNST region of the current block (408). Furthermore, video encoder 200 (e.g., LFNST unit 207) may determine that the second transform coefficients of the current block in a region of the block defined by the zero-out pattern are equal to 0 (410). In other words, video encoder 200 may zero-out the transform coefficients in the region defined by the zero-out pattern.

Additionally, video encoder 200 may determine a LFNST syntax element (412). The LFNST syntax element may specify, in combination with a mode of the current block, a size of the current block, and/or other factors, the LFNST. Video encoder 200 (e.g., entropy encoding unit 220 of video encoder 200) may signal the LFNST syntax element at a TU level (414). In other examples, video encoder 200 may signal the LFNST syntax element at a CU level or another level.

Figure 13:
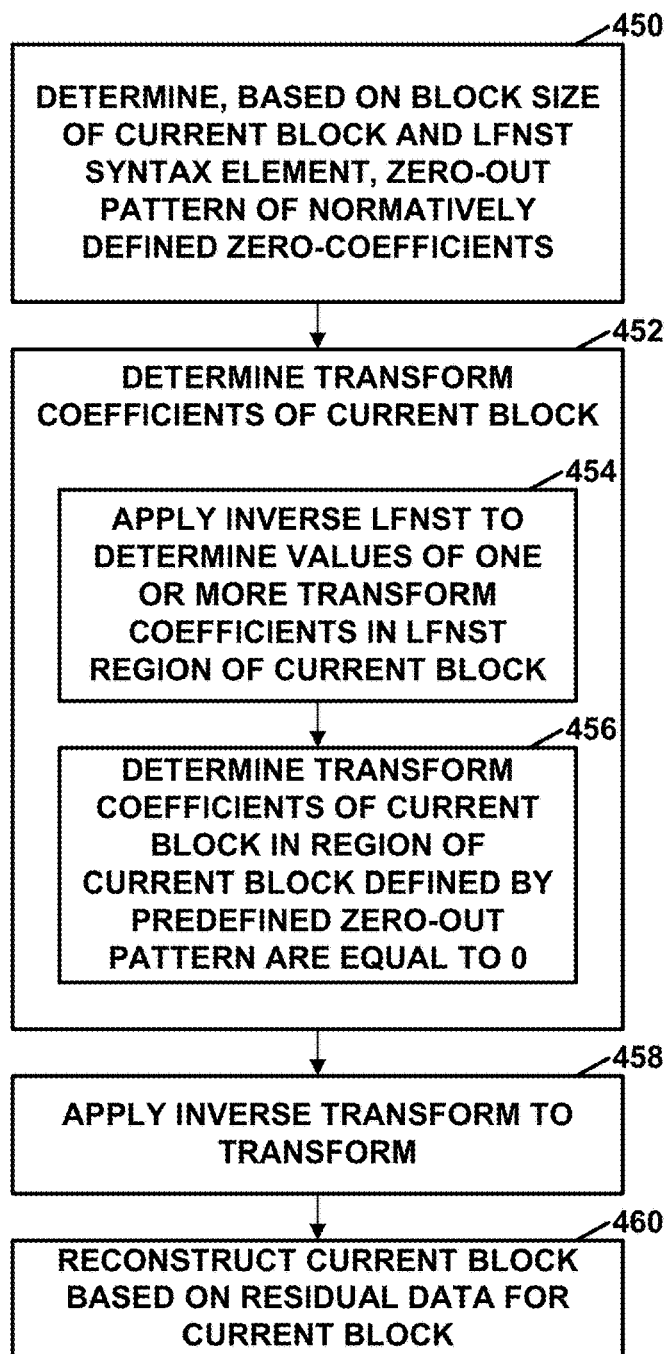
FIG. 13 is a flowchart illustrating an example method for decoding video data in accordance with one or more techniques of this disclosure.

FIG. 13 is a flowchart illustrating an example method for decoding video data in accordance with one or more techniques of this disclosure. In the example of FIG. 13, video decoder 300 (e.g., inverse LFNST unit 309 of video decoder 300) determines, based on a block size of a current block, a mode of the current block, and a LFNST syntax element, a zero-out pattern of normatively defined zero-coefficients (450). The current block may be a CU, TU, CG, subblock, or other type of block. In some examples, the LFNST syntax element is signaled at a TU level. In other examples, the LFNST syntax element is signaled at another level, such as a CU level. In some examples, the current block is a CU and the LFNST syntax element is signaled for a Furthermore, in the example of FIG. 13, video decoder 300 (e.g., inverse LFNST unit 309) may determine transform coefficients of the current block (452). The transform coefficients of the current block include transform coefficients in an LFNST region of the current block and transform coefficients outside the LFNST region of the current block.

In some examples, video decoder 300 determines a number of coded coefficient groups and non-coded coefficient groups (CGs) based on the LFNST syntax element. For instance, to determine the number of coded and non-coded CGs based on the LFNST syntax element, video decoder 300 may determine that the number of coded CGs includes any CG occurring in CG scanning order before a CG that falls entirely within the zero-out pattern. Thus, when determining the transform coefficients of the current block, video decoder 300 may determine, based on the number of CGs, that the bitstream does not include syntax elements indicating values of transform coefficients for any CGs beyond the number of coded CGs. Furthermore, in some examples, it may be unnecessary to signal CBFs for CGs that are beyond the number of coded CGs. Avoiding the need to signal CBGs for CGs that are beyond the number of coded CGs may increase coding efficiency.

Furthermore, in some examples, a last significant coefficient position of the current block is normatively restricted to a position in the current block allowed to be non-zero by the zero-out pattern. In other words, video decoder 300 may determine that the last significant coefficient position of the current block must not be in the area of the current block that is zeroed-out in the zero-out pattern. In some examples, video decoder 300 may therefore infer that any transform coefficient of the current block that is not normatively zeroed-out may be a significant coefficient. Thus, it may be unnecessary to signal syntax elements to indicate the position of the last significant transform coefficient of the current block. Avoiding the need to signal the syntax elements to indicate the position of the last significant transform coefficient of the current block may increase coding efficiency.

As part of determining the transform coefficients of the current block, video decoder 300 (e.g., inverse LFNST unit 309) may apply an inverse LFNST to determine values of one or more transform coefficients in the LFNST region of the current block (454). Additionally, as part of determining the transform coefficients, video decoder 300 (e.g., inverse LFNST unit 309) may determine that transform coefficients of the current block in a region of the current block defined by the zero-out pattern are equal to 0 (456).

Furthermore, in the example of FIG. 13, video decoder 300 (e.g., inverse transform processing unit 308) may apply an inverse transform to the transform coefficients of the current block to determine residual data for the current block (458). For example, video decoder 300 may apply an inverse DCT, inverse DST, or other type of inverse transform.

Video decoder 300 (e.g., reconstruction unit 310 of video decoder 300) may reconstruct the current block based on the residual data for the current block (460). For instance, video decoder 300 may add samples of the residual data to corresponding samples of a prediction block for the current block to reconstruct the current block.

Figure 14:
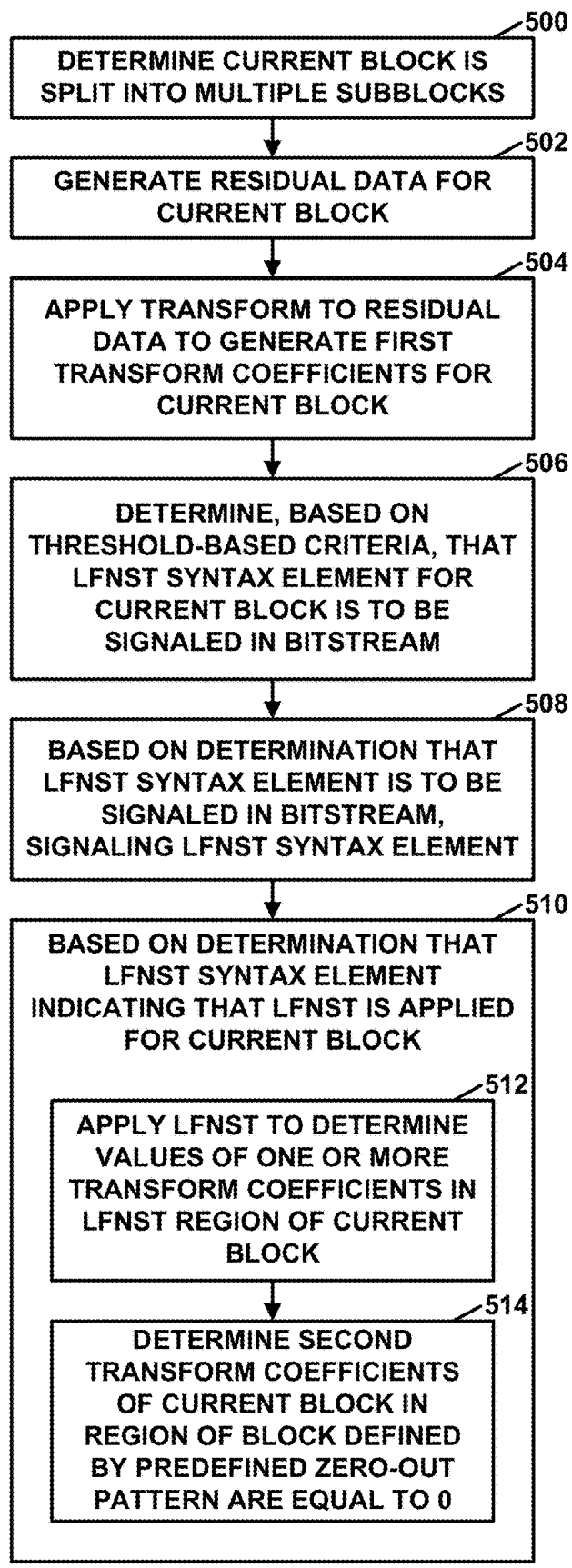
FIG. 14 is a flowchart illustrating an example method for encoding video data in accordance with one or more techniques of this disclosure.

FIG. 14 is a flowchart illustrating an example method for encoding video data in accordance with one or more techniques of this disclosure. In the example of FIG. 14, video encoder 200 may determine that a current block of the video data is split into a plurality of subblocks (500). For instance, video encoder 200 may determine that current block is split into a plurality of subblocks based on a size of the current block being greater than a threshold, based on a shape of the current block, or based on one or more characteristics of the current block or content of the current block. The plurality of subblocks include a current subblock of the current block.

Furthermore, in the example of FIG. 14, video encoder 200 (e.g., residual generation unit 204 of video encoder 200) may generate residual data for the current block of the video data, the residual data for the current block including residual data for the current subblock (502). For instance, video encoder 200 may generate the residual by subtracting samples of a prediction block for the current block from corresponding samples of the current block.

Video encoder 200 (e.g., transform processing unit 206 of video encoder 200) may apply a transform to the residual data to generate first transform coefficients for the current subblock (504). For instance, video encoder 200 may apply a DCT, DST, or other type of transform to a part of the residual data that corresponds to the current subblock to generate first transform coefficients for the current subblock.

Additionally, in the example of FIG. 14, video encoder 200 (e.g., LFNST unit 207 of video encoder 200) may determine, based on threshold-based criteria (or count-based criteria), that a LFNST syntax element for the current subblock is to be signaled in a bitstream (506). The bitstream comprises an encoded representation of the video data and the LFNST syntax element indicates whether an LFNST is applied for the current subblock.

As described in various examples provided elsewhere in this disclosure, video encoder 200 may use various threshold-based criteria and/or count-based criteria to determine whether the LFNST syntax element is to be signaled in the bitstream. For instance, in some examples, a threshold is fixed to a constant value and video encoder 200 signals the LFNST syntax element for at least one of a luma component or a chroma component depending on whether a last transform coefficient position of the current block is less than the threshold. In some such examples, the threshold is based on a last position of significant transform coefficients (i.e., the last significant transform coefficient position) of the current block. Alternatively, in some such examples, video encoder 200 may determine the threshold based on a relative location of a current TU of the current block with respect to a first-occurring TU of the current block. If a CU includes multiple TUs (such as in case of a 128×128 CU), a CU is split into 4 TUs of size 64×64. Video encoder 200 may then signal the LFNST syntax element for the first TU in scan order, and not for other TUs in the same CU. Other TUs that are not the first in scan order can reuse the LFNST syntax element from the first TU. This may reduce signaling overhead.

In some examples, video encoder 200 may determine the threshold based on whether the current block is dual tree coded or single tree coded. For instance, when the current block is dual tree coded, video encoder 200 may signal an LFNST syntax element for luma and chroma separately. When the current block is single tree coded, video encoder 200 may signal an LFNST syntax element for luma but does not need to signal an LFNST syntax element for chroma.

Furthermore, in some examples, video encoder 200 may determine the threshold based on a value of a DC component of a transform unit of the current block or a DC component of the current block. For instance, if the DC component is zero, then it is not useful to signal LFNST index. In some examples, video encoder 200 may determine the threshold based on one or more of: a magnitude, standard deviation, or statistics of transform coefficients of a TU of the current block or of the current block.

Furthermore, in the example of FIG. 14, based on the determination that the LFNST syntax element is to be signaled in the bitstream, video encoder 200 may signal the LFNST syntax element in the bitstream at a subblock level (508). For instance, in some examples, video encoder 200 may include a lfnst_idx syntax element in a transform_unit syntax structure. In such examples, the LFNST syntax element may be applied for only a single TU of the current block. In other examples, video encoder 200 may signal another type of syntax element that indicates whether LFNST is applied and, if so, which LFNST kernel to apply. Signaling the lfnst_idx syntax element at the subblock level may enable LFNST to be or not be applied for different subblocks of the same CU and/or different LFNST kernels to be applied for different subblocks of the same CU.

Video encoder 200 (e.g., LFNST unit 207 of video encoder 200) may apply the LFNST to the first transform coefficients for the current subblock to determine values of one or more second transform coefficients in an LFNST region of the current subblock (510). For instance, video encoder 200 may multiply (or perform one or more other mathematical operations) the first transform coefficients by a matrix or vector of filter coefficients associated with a LFNST kernel.

In some examples, the operations of FIG. 14 and FIG. 12 may be used in combination. For instance, prior to signaling the LFNST syntax element in (414), video encoder 200 may determine, based on threshold-based criteria or count-based criteria, that the LFNST syntax element for a subblock of the current block is to be signaled in a bitstream that comprises an encoded representation of the video data. In some such examples, as part of determining that the LFNST syntax element is to be signaled in the bitstream, video encoder 200 may determine a threshold based on at least one of: a last significant transform coefficient position of the current block, a relative location of the current subblock with respect to a first-occurring subblock of the current block, whether the current block is dual tree coded or single tree coded, or a value of a DC component of a transform unit of the current block or a DC component of the current block. In such examples, video encoder 200 may determine, based on the threshold, that the LFNST syntax element for the subblock is signaled in the bitstream. In some examples, the LFNST syntax element of FIG. 12 and FIG. 14 may be applicable for a single TU of the current block or multiple TUs of the current block.

Figure 15:
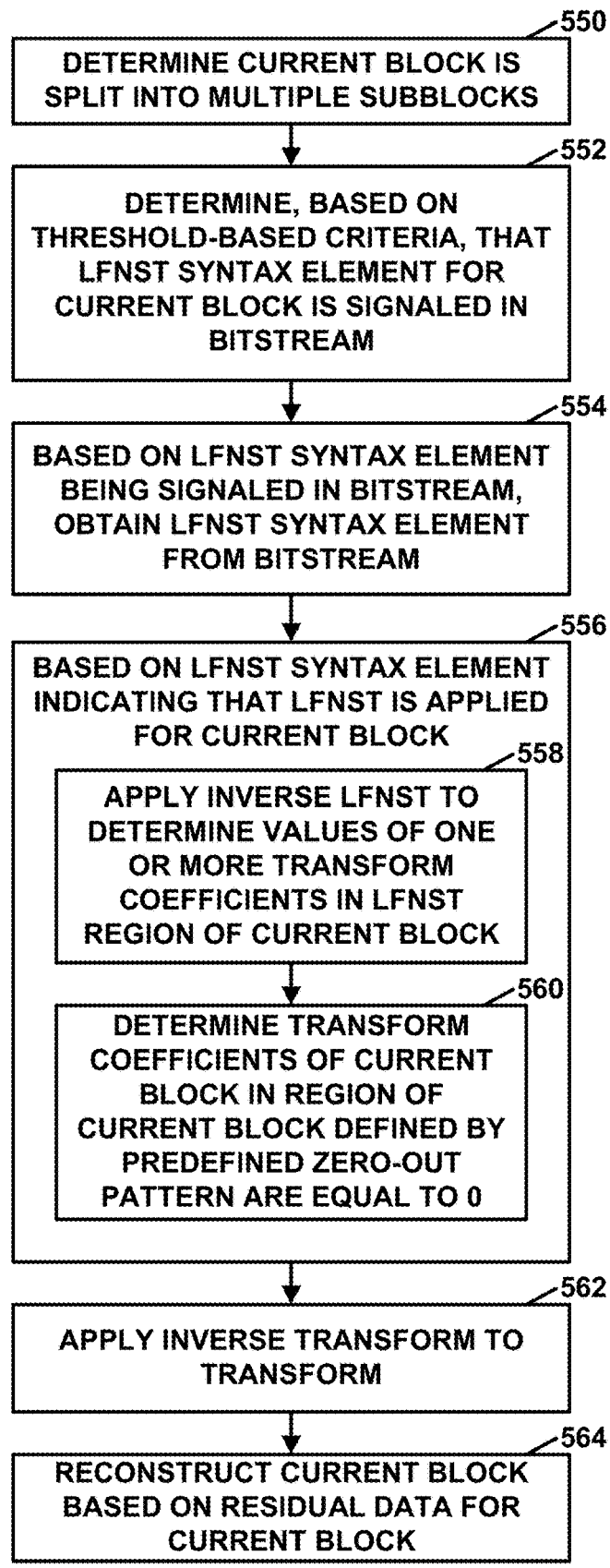
FIG. 15 is a flowchart illustrating an example method for decoding video data in accordance with one or more techniques of this disclosure.

FIG. 15 is a flowchart illustrating an example method for decoding video data in accordance with one or more techniques of this disclosure. In the example of FIG. 15, video decoder 300 may determine that a current block of the video data is split into a plurality of subblocks (550). For instance, video decoder 300 may determine that the current block is split into multiple subblocks, such as TUs, based on a size of the current block, a shape of the current block, signaled syntax elements indicating that the current block is split into subblocks, and/or other factors. In the example of FIG. 15, the plurality of subblocks includes a current subblock of the current block.

Furthermore, video decoder 300 (e.g., entropy decoding unit 302 of video decoder 300) may determine, based on threshold-based criteria (or count-based criteria), that a LFNST syntax element for a subblock of the current block is signaled in a bitstream (552). As described in various examples provided elsewhere in this disclosure, video decoder 300 may use various threshold-based criteria and/or count-based criteria to determine whether the LFNST syntax element is signaled in the bitstream. For instance, in some examples, a threshold is fixed to a constant value and video decoder 300 parses the LFNST syntax element from the bitstream for at least one of a luma component or a chroma component depending on whether a last transform coefficient position of the current block is less than the threshold. In some examples, the threshold is based on a last significant transform coefficient position of the current block. Alternatively, in some such examples, video decoder 300 may determine the threshold based on a relative location of a current TU of the current block with respect to a first-occurring TU of the current block. In some examples, video decoder 300 may determine the threshold based on whether the current block is dual tree coded or single tree coded. Furthermore, in some examples, video decoder 300 may determine the threshold based on a value of a DC component of a transform unit of the current block or a DC component of the current block. In some examples, video decoder 300 may determine the threshold based on one or more of: a magnitude, standard deviation, or statistics of transform coefficients of a TU of the current block or of the current block.

In the example of FIG. 15, based on a determination that the LFNST syntax element is signaled in the bitstream, video decoder 300 (e.g., entropy decoding unit 302 of video decoder 300) may obtain the LFNST syntax element from the bitstream (554). For instance, video decoder 300 may parse the LFNST syntax element from the bitstream. The LFNST syntax element (e.g., a LFNST index or LFNST flag) may indicate whether or not LFNST is applied for the current subblock and, if so, which LFNST (e.g., which LFNST kernel) to apply for the current subblock.

Based on the LFNST syntax element indicating that an LFNST is applied for the current subblock, video decoder 300 (e.g., LFNST unit 309) may apply an inverse of the LFNST to determine values of one or more transform coefficients in an LFNST region of the subblock of the current block (556). For instance, video decoder 300 may multiply (or perform one or more other types of mathematical operations) signaled transform coefficients in the LFNST region of the subblock by values specified in a matrix for the LFNST to determine the transform coefficients in the LFNST region of the subblock of the current block.

Additionally, in the example of FIG. 15, video decoder 300 may apply an inverse transform to the transform coefficients of the subblock of the current block to determine residual data for the subblock of the current block (558). For instance, video decoder 300 may apply an inverse DCT, inverse DST, or other type of inverse transform to the determine the residual data for the subblock.

Video decoder 300 may reconstruct the current block based on the residual data for the subblock of the current block (560). For instance, video decoder 300 may add samples of residual data for the current block (including samples of the residual data for the current subblock of the current block) to corresponding samples of a prediction block for the current block in order to reconstruct the current block.

In some examples, video decoder 300 may perform the operation of FIG. 15 in combination with the operation of FIG. 13. Thus, in some examples, prior to determining the zero-out pattern in (450), video decoder 300 may determine, based on threshold- or count-based criteria, that an LFNST syntax element is signaled in the bitstream. In some such examples, as part of determining that the LFNST syntax element is signaled in the bitstream, video decoder 300 may determine a threshold based on at least one of: a last significant transform coefficient position of the current block, a relative location of the current subblock with respect to a first-occurring subblock of the current block, whether the current block is dual tree coded or single tree coded, or a value of a DC component of a transform unit of the current block or a DC component of the current block. Video decoder 300 may determine, based on the threshold, that the LFNST syntax element for the subblock is signaled in the bitstream. In some examples, the LFNST syntax element of FIG. 13 and FIG. 15 may be applicable for a single TU of the current block or multiple TUs of the current block.

The following is a non-exclusive list of examples that are in accordance with one or more techniques of this disclosure.

Example 1. A method of decoding video data, the method comprising: determining, based on a block size of a current block and a low-frequency non-separable transform (LFNST) syntax element, a zero-out pattern of normatively defined zero-coefficients; determining coefficients of the current block, wherein the coefficients of the current block include coefficients in an LFNST region of the current block and coefficients outside the LFNST region of the current block, and determining the coefficients of the current block comprises: applying an inverse LFNST to determine values of one or more coefficients in the LFNST region of the current block; and determining that coefficients of the current block in a region of the current block defined by the predefined zero-out pattern are equal to 0; applying an inverse transform to the coefficients of the current block to determine residual data for the current block; and reconstructing the current block based on the residual data for the current block.

Example 2. A method of encoding video data, the method comprising: generating residual data for a current block of the video data; applying a transform to the residual data to generate first coefficients for the current block; determining a low-frequency non-separable transform (LFNST) syntax element; determining, based on a block size of the current block and the LFNST syntax element, a predefined zero-out pattern of normatively defined zero-coefficients; and determining second coefficients of the current block, wherein the current block includes an LFNST region, and determining the second coefficients of the current block comprises: applying a LFNST to determine values of one or more second coefficients in the LFNST region of the current block; and determining that second coefficients of the current block in a region of the block defined by the predefined zero-out pattern are equal to 0.

Example 3. The method of any of examples 1 or 2, wherein the LFNST syntax element is signaled at a transform unit (TU) level.

Example 4. The method of any of examples 1-3, further comprising determining a number of coded coefficient groups and non-coded coefficient groups (CGs) based on the LFNST syntax element.

Example 5. The method of any of examples 1-4, wherein a last coefficient position is normatively restricted to a position in the current block allowed to be non-zero by the predefined zero-out pattern.

Example 6. The method of any of examples 1-5, wherein a last coefficient position is normatively restricted to a predetermined position in the current block where coefficients of the block beyond the predetermined position are defined by the predefined zero-out pattern to be zeroed-out.

Example 7. The method of any of examples 1-6, wherein the current block is a subblock of a coding unit (CU) and the LFNST syntax element is signaled for a subset of subblocks of the CU.

Example 8. A method of decoding video data, the method comprising: determining that a current block of the video data is split into multiple subblocks; determining, based on a threshold or count-based criteria, that a Low-Frequency Non-Separable Transform (LFNST) syntax element for the current block is signaled in a bitstream that comprises an encoded representation of the video data; based on the LFNST syntax element being signaled in the bitstream, obtaining the LFNST syntax element from the bitstream; based on the LFNST syntax element indicating that LFNST is applied for the current block: applying an inverse LFNST to determine values of one or more coefficients in the LFNST region of the current block; and determining that coefficients of the current block in a region of the current block defined by the predefined zero-out pattern are equal to 0; applying an inverse transform to the coefficients of the current block to determine residual data for the current block; and reconstructing the current block based on the residual data for the current block.

Example 9. A method of encoding video data, the method comprising: determining that a current block of the video data is split into multiple subblocks; generating residual data for the current block of the video data; applying a transform to the residual data to generate first coefficients for the current block; determining, based on a threshold or count-based criteria, that a Low-Frequency Non-Separable Transform (LFNST) syntax element for the current block is to be signaled in a bitstream that comprises an encoded representation of the video data, the LFNST syntax element indicating whether LFNST is applied for the current block; based on the determination that the LFNST syntax element is to be signaled in the bitstream, signaling the LFNST syntax element in the bitstream; based on a the LFNST syntax element indicating that LFNST is applied for the current block: applying a LFNST to determine values of one or more second coefficients in the LFNST region of the current block; and determining that second coefficients of the current block in a region of the block defined by the predefined zero-out pattern are equal to 0.

Example 10. The method of any of examples 8 or 9, wherein the threshold is fixed to a constant value and the LFNST is signaled for at least one of a luma component or a chroma component depending on whether a last transform coefficient position of the current block is less than the threshold.

Example 11. The method of any of examples 8 or 9, wherein the threshold is based on a last position of transform coefficients of the current block.

Example 12. The method of any of examples 8-11, wherein the threshold is determined based on a relative location of a current transform unit (TU) of the current block with respect to a first-occurring TU of the current block.

Example 13. The method of any of examples 8-12, wherein the threshold is based on whether the current block is dual tree coded or single tree coded.

Example 14. The method of any of examples 8-13, wherein the threshold is based on a value of a DC component of a transform unit of the current block or a DC component of the current block.

Example 15. The method of any of examples 8-14, wherein the threshold is based on one or more of: a magnitude, standard deviation, or statistics of transform coefficients of a TU of the current block or of the current block.

Example 16. The method of any of examples 8-15, wherein the LFNST syntax element is applicable for a single TU of the current block.

Example 17. A device for coding video data, the device comprising one or more means for performing the method of any of examples 1-16.

Example 18. The device of example 17, wherein the one or more means comprise one or more processors implemented in circuitry.

Example 19. The device of any of examples 17 and 18, further comprising a memory to store the video data.

Example 20. The device of any of examples 17-19, further comprising a display configured to display decoded video data.

Example 21. The device of any of examples 17-20, wherein the device comprises one or more of a camera, a computer, a mobile device, a broadcast receiver device, or a set-top box.

Example 22. The device of any of examples 17-21, wherein the device comprises a video decoder.

Example 23. The device of any of examples 17-22, wherein the device comprises a video encoder.

Example 24. A computer-readable storage medium having stored thereon instructions that, when executed, cause one or more processors to perform the method of any of examples 1-16.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining, based on a block size of a current block and a low-frequency non-separable transform (LFNST) syntax element, a zero-out pattern of normatively defined zero-coefficients, wherein the LFNST syntax element is signaled at a transform unit (TU) level, wherein a normative restriction limits a last significant coefficient position of the current block to a position in the current block allowed to be non-zero by the determined zero-out pattern;
   based on the normative restriction limiting the last significant coefficient position of the current block to the position in the current block allowed to be non-zero by the determined zero-out pattern, inferring that the last significant coefficient position of the current block is in a region of the current block that is not zeroed out by the determined zero-out pattern;
   determining transform coefficients of the current block, wherein the transform coefficients of the current block include transform coefficients in an LFNST region of the current block and transform coefficients outside the LFNST region of the current block, and determining the transform coefficients of the current block comprises:
   applying an inverse LFNST to determine values of one or more transform coefficients in the LFNST region of the current block; and
   determining that transform coefficients of the current block in a region of the current block defined by the zero-out pattern are equal to 0;
   applying an inverse transform to the transform coefficients of the current block to determine residual data for the current block; and
   reconstructing the current block based on the residual data for the current block.

2. The method of claim 1, further comprising: determining a number of coded coefficient groups (CGs) and non-coded CGs based on the LFNST syntax element.

3. The method of claim 1, further comprising:
   determining that the current block is split into a plurality of subblocks, the plurality of subblocks including a current subblock of the current block, wherein the LFNST syntax element is for a subblock of the current block, and the LFNST region of the current block is an LFNST region of the subblock;
   determining, based on threshold-based criteria, that the LFNST syntax element for the subblock of the current block is signaled in a bitstream; and
   based on a determination that the LFNST syntax element is signaled in the bitstream, obtaining the LFNST syntax element from the bitstream.

4. The method of claim 1, wherein the LFNST syntax element is applicable for only a single TU of a plurality of TUs of the current block and not other TUs of the plurality of TUs of the current block.

5. A device for decoding video data, the device comprising:
   a memory to store the video data; and
   one or more processors implemented in circuitry, the one or more processors configured to:
   determine, based on a block size of a current block and a low-frequency non-separable transform (LFNST) syntax element, a zero-out pattern of normatively defined zero-coefficients, wherein the LFNST syntax element is signaled at a transform unit (TU) level, wherein a normative restriction limits a last significant coefficient position of the current block to a position in the current block allowed to be non-zero by the determined zero-out pattern;
   based on the normative restriction limiting the last significant coefficient position of the current block to the position in the current block allowed to be non-zero by the determined zero-out pattern, infer that the last significant coefficient position of the current block is in a region of the current block that is not zeroed out by the determined zero-out pattern;
   determine transform coefficients of the current block, wherein the transform coefficients of the current block include transform coefficients in an LFNST region of the current block and transform coefficients outside the LFNST region of the current block, and the one or more processors are configured such that, as part of determining the transform coefficients of the current block, the one or more processors:
apply an inverse LFNST to determine values of one or more transform coefficients in the LFNST region of the current block; and
determine that transform coefficients of the current block in a region of the current block defined by the zero-out pattern are equal to 0;
apply an inverse transform to the transform coefficients of the current block to determine residual data for the current block; and
reconstruct the current block based on the residual data for the current block.

6. The device of claim 5, wherein the one or more processors are further configured to determine a number of coded coefficient groups (CGs) and non-coded CGs based on the LFNST syntax element.

7. The device of claim 5, wherein the one or more processors are further configured to:
determine that the current block is split into a plurality of subblocks, the plurality of subblocks including a current subblock of the current block, wherein the LFNST syntax element is for a subblock of the current block, and the LFNST region of the current block is an LFNST region of the subblock;
determine, based on threshold-based criteria, that the LFNST syntax element for the subblock of the current block is signaled in a bitstream; and
based on a determination that the LFNST syntax element is signaled in the bitstream, obtain the LFNST syntax element from the bitstream.

8. The device of claim 5, further comprising a display configured to display decoded video data.

9. The device of claim 5, wherein the device comprises one or more of a camera, a computer, a mobile device, a broadcast receiver device, or a set-top box.

* * * * *